United States Patent
Pathak et al.

(10) Patent No.: US 12,374,337 B2
(45) Date of Patent: Jul. 29, 2025

(54) SYSTEMS AND METHODS FOR GPT GUIDED NEURAL PUNCTUATION FOR CONVERSATIONAL SPEECH

(71) Applicant: MICROSOFT TECHNOLOGY LICENSING, LLC, Redmond, WA (US)

(72) Inventors: Sayan Dev Pathak, Kirkland, WA (US); Ayush Vikram, Princeton, NJ (US); Zoltan Romocsa, Kenmore, WA (US); Amy Parag Shah, Bothell, WA (US); Piyush Behre, Santa Clara, CA (US); Sharman W Tan, Fremont, CA (US); Amit Kumar Agarwal, Redmond, WA (US); Christopher Hakan Basoglu, Everett, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 17/978,638

(22) Filed: Nov. 1, 2022

(65) Prior Publication Data

US 2024/0144931 A1  May 2, 2024

(51) Int. Cl.
*G06F 40/51* (2020.01)
*G06F 40/211* (2020.01)
(Continued)

(52) U.S. Cl.
CPC .............. *G10L 15/26* (2013.01); *G10L 15/01* (2013.01); *G10L 15/063* (2013.01); *G10L 19/0018* (2013.01)

(58) Field of Classification Search
CPC ... G10L 15/26; G10L 15/22; G10L 2015/088; G10L 15/18; G10L 15/1822; G10L 21/00;
(Continued)

(56) References Cited

U.S. PATENT DOCUMENTS 5,797,123 A * 8/1998 Chou ................ G10L 15/18
704/256.5
11,176,944 B2 * 11/2021 Boekweg .............. G06F 16/345
(Continued)

FOREIGN PATENT DOCUMENTS

| CN | 111767714 B | 2/2022 |
| CN | 114611492 A | 6/2022 |

OTHER PUBLICATIONS

Chi, et al., "Neural Generation Meets Real People: Building a Social, Informative Open-Domain Dialogue Agent", In Repository of arXiv:2207.12021v1, Jul. 25, 2022, 20 Pages.
(Continued)

*Primary Examiner* — Olujimi A Adesanya
(74) *Attorney, Agent, or Firm* — Workman Nydegger

(57) ABSTRACT

Some disclosed embodiments are directed to obtaining a decoded audio data including a spoken language utterance recognized in audio data and identifying a disfluency in the decoded audio data. Upon determining that correcting the disfluency would improve a readability score of the decoded audio data, the system generates a particular correction to correct the disfluency and applies the particular correction to the decoded audio data. Then, an updated decoded audio data is generated which reflects the particular correction. The updated decoded audio data has improved readability over the decoded audio data.

19 Claims, 19 Drawing Sheets

(51) Int. Cl.
*G10L 15/01* (2013.01)
*G10L 15/06* (2013.01)
*G10L 15/26* (2006.01)
*G10L 19/00* (2013.01)

(58) Field of Classification Search
CPC .............. G10L 2015/223; G10L 15/01; G10L 2015/225; G10L 2015/227; G10L 21/057
See application file for complete search history.

(56) References Cited

U.S. PATENT DOCUMENTS

| | | | | |
|---|---|---|---|---|
| 11,556,722 | B1* | 1/2023 | Ben Shahar | G06F 40/51 |
| 2002/0156627 | A1* | 10/2002 | Itoh | G10L 15/187 704/E15.02 |
| 2007/0055514 | A1* | 3/2007 | Beattie | G10L 15/08 704/235 |
| 2009/0319265 | A1* | 12/2009 | Wittenstein | G10L 15/26 704/E15.015 |
| 2011/0040554 | A1* | 2/2011 | Audhkhasi | G09B 19/04 704/235 |
| 2013/0289984 | A1* | 10/2013 | Hakkani-Tur | G06F 21/6254 704/235 |
| 2014/0337370 | A1* | 11/2014 | Aravamudan | G06F 16/245 707/759 |
| 2015/0012867 | A1* | 1/2015 | Yoon | G06F 3/0233 715/773 |
| 2018/0270350 | A1* | 9/2018 | Engelke | H04M 1/2475 |
| 2019/0279622 | A1* | 9/2019 | Liu | G10L 15/22 |
| 2019/0332658 | A1* | 10/2019 | Heckel | G06N 3/08 |
| 2020/0027445 | A1* | 1/2020 | Raghunathan | G10L 15/32 |
| 2020/0065612 | A1* | 2/2020 | Xu | G06V 40/174 |
| 2021/0056956 | A1 | 2/2021 | Dimitriadis | |
| 2021/0375289 | A1* | 12/2021 | Zhu | G10L 15/22 |
| 2021/0375291 | A1* | 12/2021 | Zeng | H04L 67/306 |
| 2022/0343914 | A1* | 10/2022 | Bonser | G10L 15/02 |
| 2023/0020574 | A1* | 1/2023 | Zhicharevich | G06F 40/253 |
| 2023/0112369 | A1* | 4/2023 | Chopra | G06N 3/044 705/304 |

OTHER PUBLICATIONS

International Search Report and Written Opinion received for PCT Application No. PCT/US2023/035162 (MS #412221-PCT01), Mar. 25, 2024, 21 pages.

Invitation to Pay Additional Fees received for PCT Application No. PCT/US2023/035162 (MS #412221-PCT01), Feb. 2, 2024, 14 pages.

Karakanta, et al., "Evaluating Subtitle Segmentation for End-to-end Generation Systems", arxiv.org, Cornell University, Retrieved from https://arxiv.org/pdf/2205.09360.pdf, May 19, 2022, 10 Pages.

International Preliminary Report on Patentability received for PCT Application No. PCT/US23/035162, May 15, 2025, 13 pages.

* cited by examiner

SYSTEMS AND METHODS FOR GPT GUIDED NEURAL PUNCTUATION FOR CONVERSATIONAL SPEECH

BACKGROUND

Automatic speech recognition systems and other speech processing systems are used to process and decode audio data to detect speech utterances (e.g., words, phrases, and/or sentences). The processed audio data is then used in various downstream tasks such as search-based queries, speech to text transcription, language translation, closed captioning, etc. Oftentimes, the processed audio data needs to be segmented into a plurality of audio segments before being transmitted to downstream applications, or to other processes in streaming mode.

Conventional systems are configured to perform audio segmentation for continuous speech today based on timeout driven logic. In such speech recognition systems, audio is segmented after a certain amount of silence has elapsed at the end of a detected word (i.e., when the audio has "timed-out"). This time-out-based segmentation does not consider the fact that somebody may naturally pause in between a sentence while thinking what they would like to say next. Consequently, the words are often chopped off in the middle of a sentence before somebody has completed elucidating a sentence. This degrades the quality of the output for data consumed by downstream post-processing components, such as by a punctuator or machine translation components. Previous systems and methods were developed which included neural network-based models that combined current acoustic information and the corresponding linguistic signals for improving segmentation. However, even such approaches, while superior to time-out-based logic, were found to over-segment the audio leading to some of the same issues as the time-out-based logic segmentation.

For example, FIG. 1A depicts a conventional automatic speech recognition system comprising a decoder 104, a punctuator 108, and a user display 112. FIG. 1B illustrates an example of conventional flow with the speech recognition system shown in FIG. 1. As shown, audio 102 comprising spoken language utterances (e.g., spoken language utterances such as "i will walk the dog tonight at ten pm i will . . . feed him after i walk him", audio 114) is used as input to the decoder 104 which decodes the audio 102 and outputs a decoded segment 106 (e.g., "i will walk the dog tonight at ten pm i will", decoded segment 118). This decoded segment 106 is input to the punctuator 108 which punctuates the decoded segment 106 in order to output a punctuated output 110 (e.g., "I will walk the dog tonight at ten pm. I will.", punctuated output 122). This punctuated output 110 is then transmitted to the user display 112 to be displayed to a user.

Notably, as shown in FIG. 1B, the system has not properly punctuated the punctuated output, because of the inclusion of the partial sentence "I will." which is an incomplete sentence. This degrades the viewing quality of the transcription on the user display because the user is presented with this incorrect punctuated output. The system may be able to go back and re-output a corrected version of the output, but conventional systems replace the already displayed incorrect output with the newly corrected output, which can be confusing to a user who is viewing the user display being dynamically changed with different outputs of the same portion of audio data.

Additionally, in some instances, the system is unable to punctuate correctly because of the presence of certain disfluencies in the decoded segment. These disfluencies arise from the different nature of speaking communication versus written communication. For example, while a person is speaking, they may pause, stutter, repeat words, or use interjections (e.g., filler words) such as "uhm". It can be difficult to generate readable transcriptions of spoken language utterances because of these disfluencies.

In view of the foregoing, there is an ongoing need for improved systems and methods for segmenting audio in order to generate more accurate, readable transcriptions that correspond to complete speech utterances included in the audio and high quality displaying of those transcriptions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for generating improved transcriptions for spoken language utterances recognized in input audio data. In particular, disclosed embodiments are directed to systems and methods for improving the readability of decoded audio data.

For example, systems are provided for obtaining a decoded audio data including a spoken language utterance recognized in audio data, identifying a disfluency in the decoded audio data, and determining that correcting the disfluency would improve a readability of the decoded audio data. Once the system has identified the disfluency and determined that it should be corrected in order to improve the readability of the decoded audio data, the systems generate a particular correction to correct the disfluency and apply the particular correction to the decoded audio data. Finally, an updated decoded audio data is generated which reflects the particular correction that was applied to the decoded audio data. In such instances, the updated decoded audio data is characterized by improved readability over the decoded audio data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are directed towards systems and methods for generating transcriptions of audio data. In this regard, it will be appreciated that some of the disclosed embodiments are specifically directed to improved systems and methods for improving segmentation and punctuation of the transcriptions of the audio data by refraining from outputting incomplete linguistic segments. The disclosed embodiments provide many technical advantages over existing systems.

Cognitive services, such as ASR systems, cater to a diverse range of customers. Each customer wants to optimize their experience against latency, accuracy, and cost of goods sold (COGS). Improvement of segmentation is key to influencing punctuating as the two are closely related. Many existing systems that comprise powerful neural network-based approaches incur high latency and/or COGS. These models are thus not possible to be used for customers that are latency sensitive (e.g., as in streaming audio applications). Even for customers that are latency tolerant, the existing speech recognition services produce mid-sentence breaks after long segments of uninterrupted speech (over-segmentation). This degrades readability when such breaks occur.

However, semantic segmentors, such as those included in disclosed embodiments herein, enable significant readability improvement with no degradation in accuracy while improving the rendering of individual sentences much faster when compared with current production. Thus, disclosed embodiments realize significant improvements for all word-based languages even without neural models for segmentation. Furthermore, this further improves the machine translation performance.

One advantage of the disclosed embodiments is that they deliver significant improvement in readability of closed-captioning services. Such embodiments improve the punctuation accuracy, which in turn can also help improve the overall functionality of the semantic segmentor. Depending on the customers constraints, users can select from different parameters in order to customize a tradeoff between latency, accuracy, and COGs. Such an approach allows a system/service level combination of best of both the worlds (segmentation and punctuation) given customer constraints.

Figure 1A:
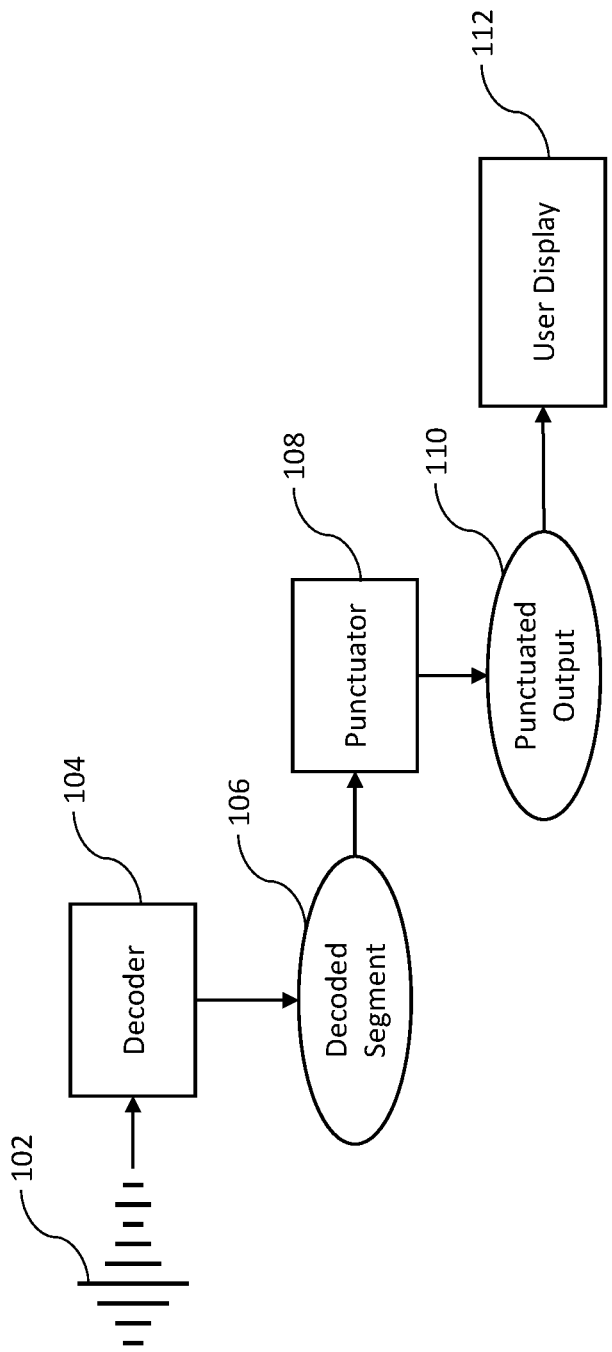
FIGS. 1A-1B illustrates various example embodiments of existing speech recognition and transcription generation systems.
Figure 1B:
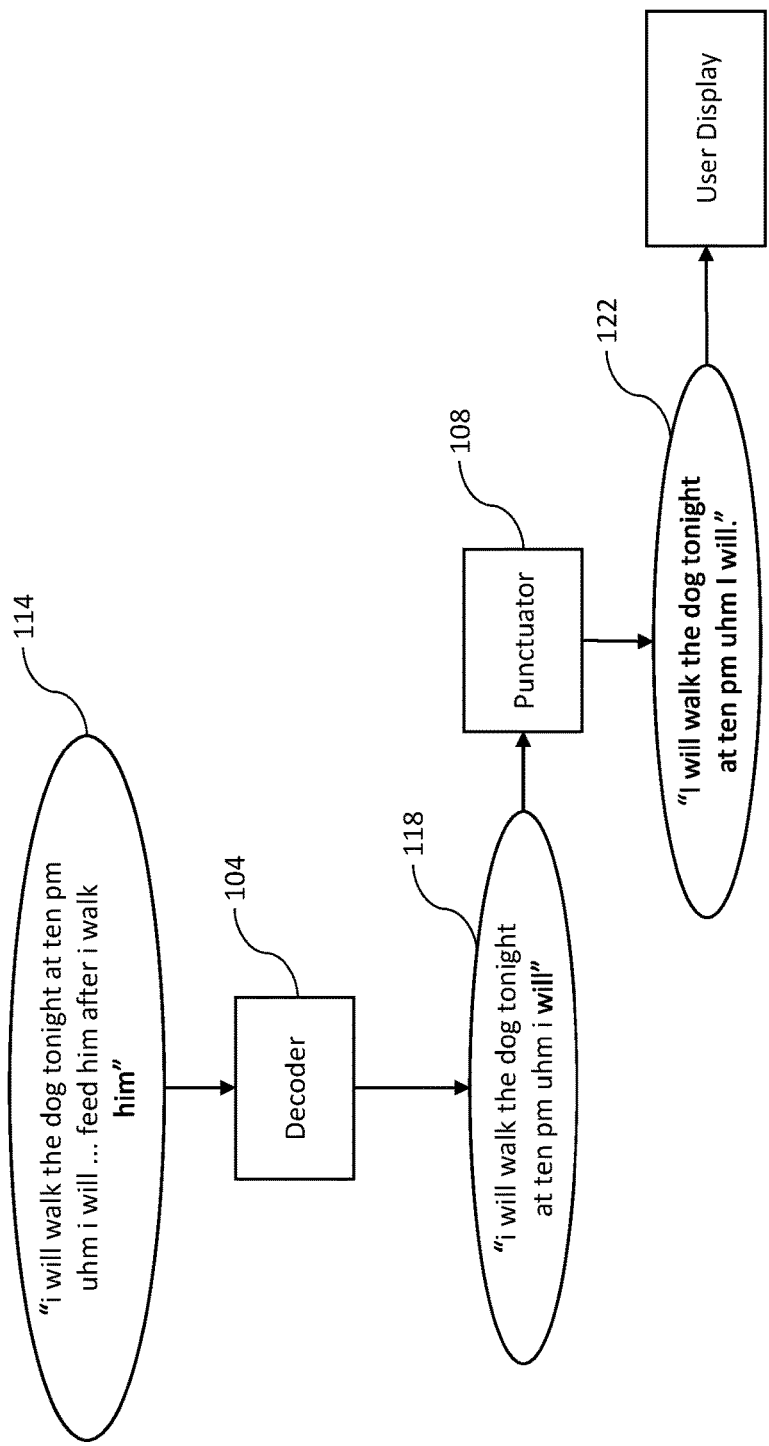
Figure 2:
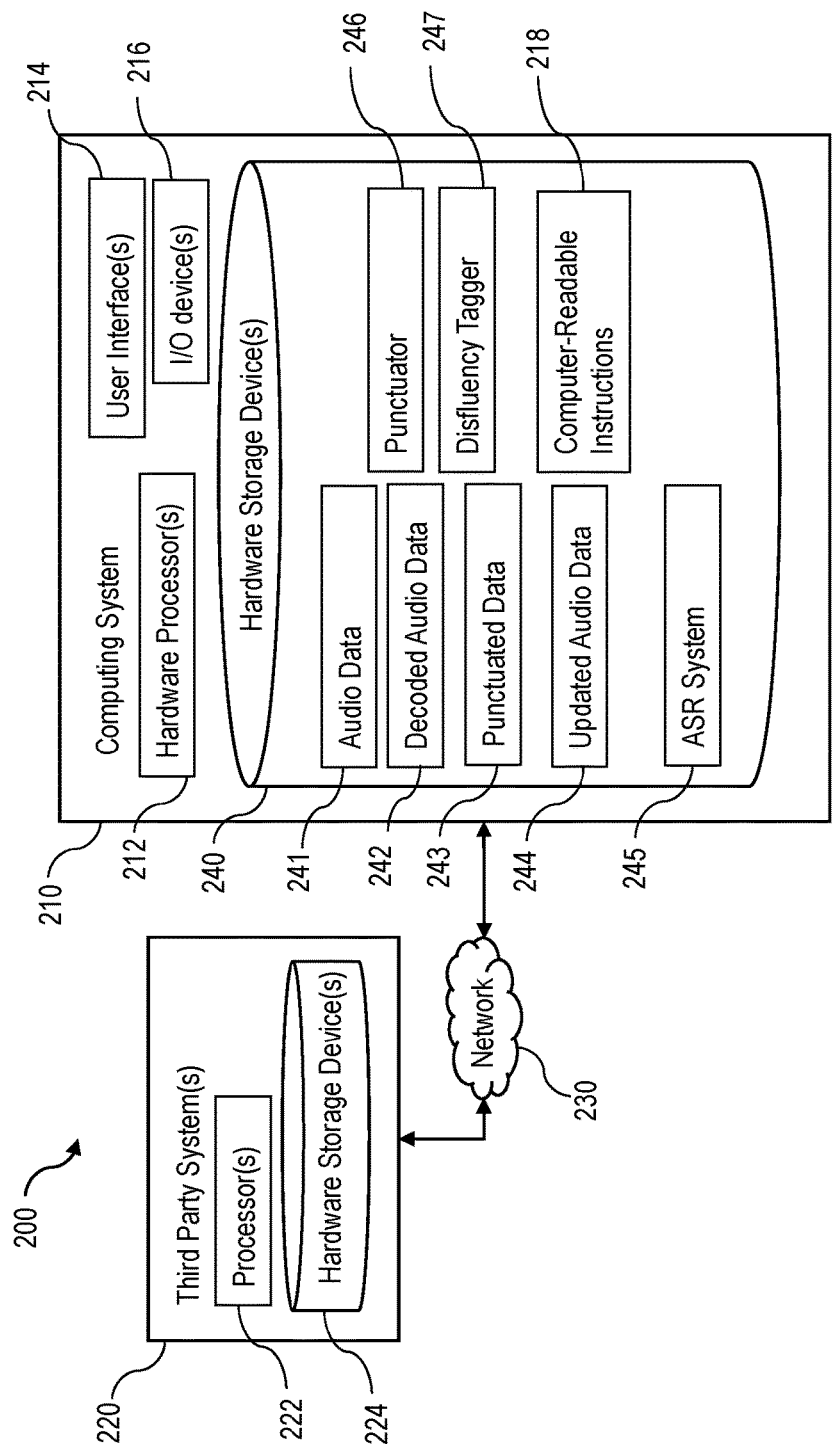
FIG. 2 illustrates a computing environment in which a computing system incorporates and/or is utilized to perform disclosed aspects of the disclosed embodiments.

Attention will now be directed to FIG. 2, which illustrates a computing environment 200 that also includes third-party system(s) 220 in communication (via network 230) with a computing system 210, which incorporates and/or is utilized to perform disclosed aspects of the disclosed embodiments. Third-party system(s) 220 includes one or more processor(s) 222 and one or more hardware storage device(s) 224.

The computing system 210, for example, includes one or more processor(s) (such as one or more hardware processor(s) 212) and a storage (i.e., hardware storage device(s) 240) storing computer-readable instructions 118 wherein one or more of the hardware storage device(s) 240 is able to house any number of data types and any number of computer-executable instructions 218 by which the computing system 210 is configured to implement one or more aspects of the disclosed embodiments when the computer-executable instructions 218 are executed by the one or more processor(s) 212. The computing system 210 is also shown including user interface(s) 214 and input/output (I/O) device(s) 216.

As shown in FIG. 2, hardware storage device(s) 240 is shown as a single storage unit. However, it will be appreciated that the hardware storage device(s) 240 is, a distributed storage that is distributed to several separate and sometimes remote systems and/or third-party system(s) 220. The computing system 210 can also comprise a distributed system with one or more of the components of computing system 210 being maintained/run by different discrete systems that are remote from each other and that each perform different tasks. In some instances, a plurality of distributed systems performs similar and/or shared tasks for implementing the disclosed functionality, such as in a distributed cloud environment.

The hardware storage device(s) 240 are configured to store and/or cache in a memory store the different data types including audio data 241, decoded audio data 242, punctuated data 243, and updated decoded audio data 244, as described herein. The hardware storage device(s) 240 also store the ASR system 245 which comprises at least the punctuator 246 and disfluency tagger 247.

The audio data 241 comprises both natural language audio and simulated audio. The audio is obtained from a plurality of locations and applications. In some instances, natural language audio is extracted from previously recorded or downloaded files such as video recordings having audio or audio-only recordings. Some examples of recordings include videos, podcasts, voicemails, voice memos, songs, etc. Natural language audio is also extracted from actively streaming content which is live continuous speech such as a news broadcast, phone call, virtual or in-person meeting, etc. In some instances, a previously recorded audio file is streamed. Audio data comprises spoken language utterances with or without a corresponding clean speech reference signal. Natural audio data is recorded from a plurality of sources, including applications, meetings comprising one or more speakers, ambient environments including background noise and human speakers, etc. It should be appreciated that the natural language audio comprises one or more spoken languages of the world's spoken languages.

Decoded audio data 242 comprises speech labels corresponding to the spoken language utterances recognized in the audio data 241, as output by the ASR system. The decoded audio data 242 is then punctuated by the punctuator 246, using soft and/or hard punctuations. The punctuated data 243 is then analyzed by the disfluency tagger 247 which is configured to identify and tag disfluencies in the punctuated data 243. These disfluencies can be related to interjection or filler words, repeated words, poor initial punctuation, low recognition score words, confidential words, mismatched reading comprehension score words, among other disfluencies discussed below in reference to FIGS. 6-11. The system then determines if the disfluency should be corrected and what correction should be made. If the correction to the disfluency is made, the system generates updated decoded audio data 244 (e.g., corrected labels and/or punctuation corresponding to the spoken language utterances that had been recognized).

Figure 3A:
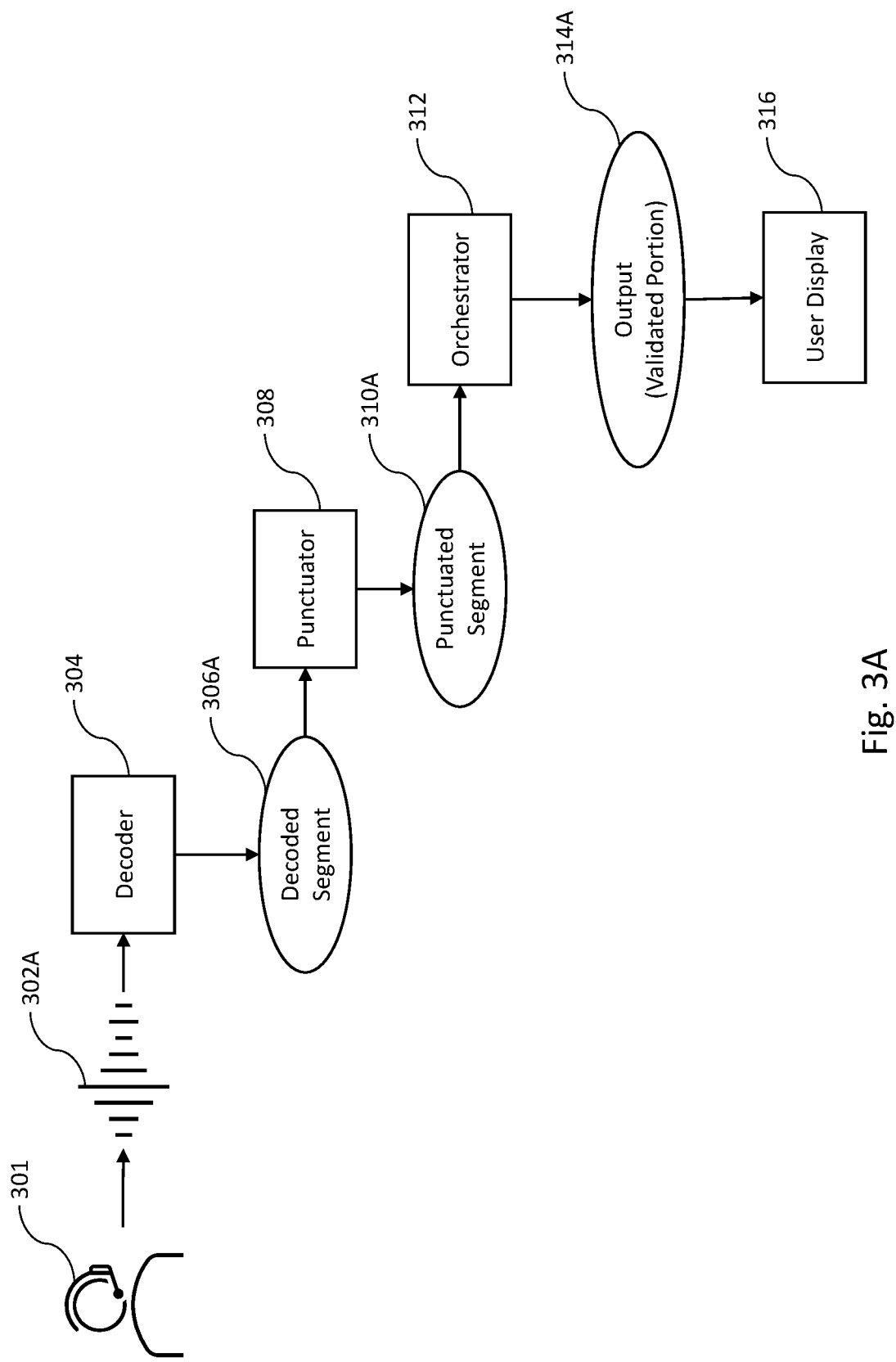
FIGS. 3A-3C illustrate various examples and/or stages of a flowchart for a system configured to orchestrate transmittal of the transcription output after speech segments have been punctuated.
Figure 3B:
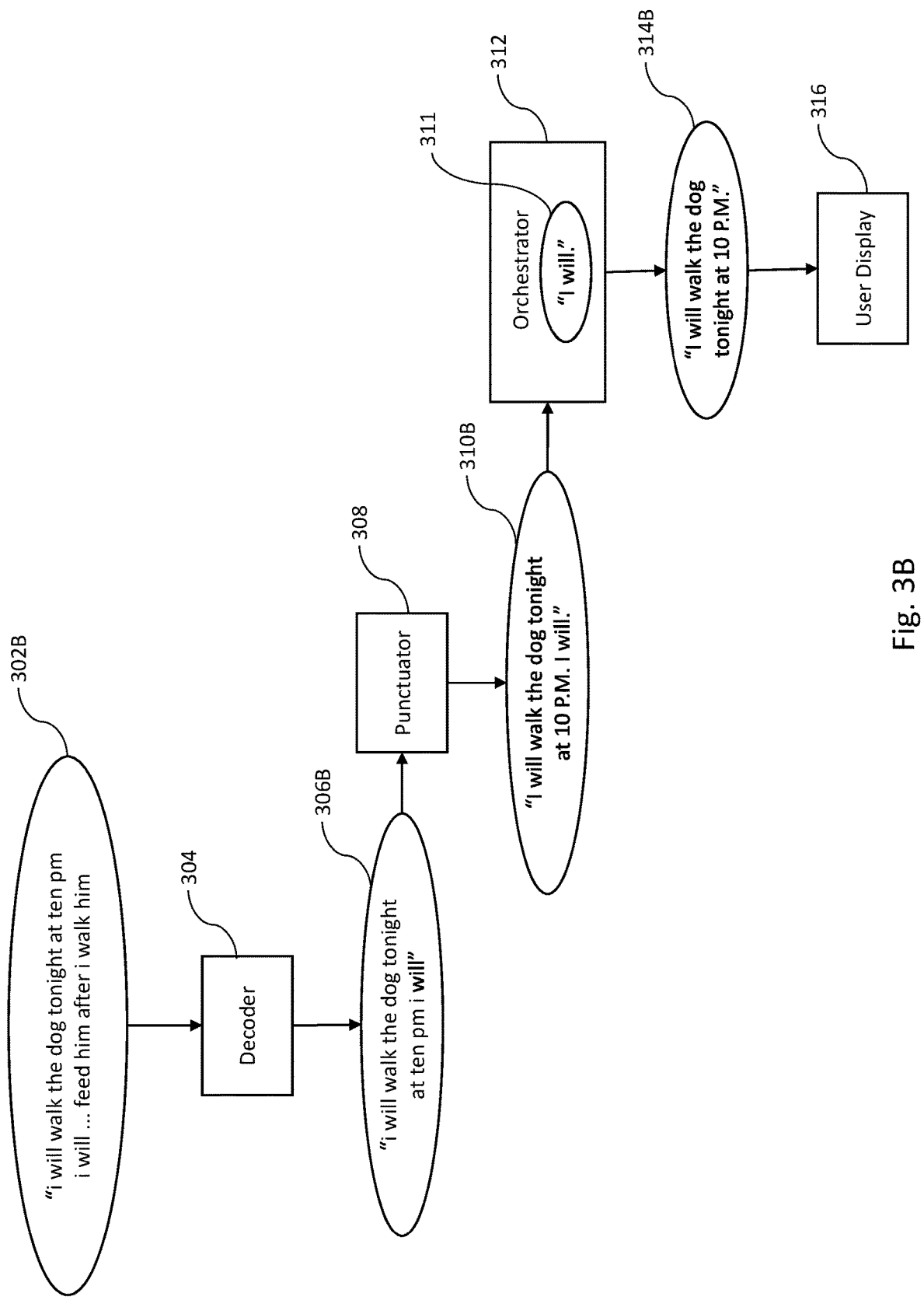
Figure 3C:
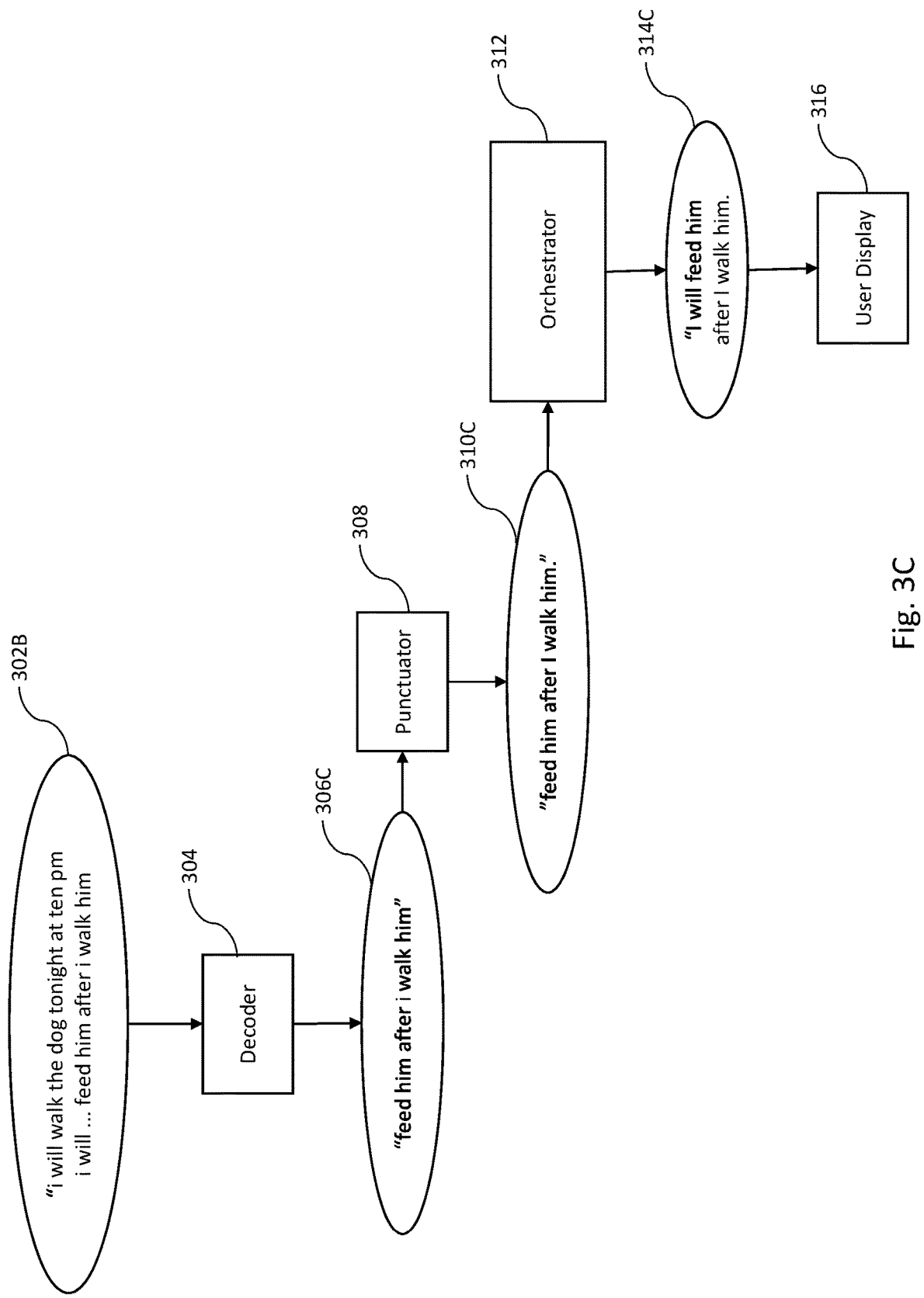

Attention will now be directed to FIGS. 3A-3C, which illustrate various examples and/or stages of a flowchart for a system configured to orchestrate transmittal of the transcription output after speech segments have been punctuated. FIGS. 3A-3C are shown having a decoder 304, a punctuator 308, an orchestrator 312, and a user display 316. Attention will first be directed to FIG. 3A, wherein the decoder 304 is configured to decode spoken language utterances recognized in input audio (e.g., streaming audio data 302A) associated with speaker 301 in order to generate decoded audio segments (e.g., decoded segment 306A). In some instances, the decoded segment comprises speech data representations and/or speech data transcriptions (i.e., speech token labels). The decoded segments are then punctuated by the punctuator 308 at one or more linguistic boundaries identified within the decoded segment. In some instances, the decoder 304 is configured to identify the linguistic boundaries. Additionally, or alternatively, the punctuator 308 is configured to identify a linguistic boundary within the decoded segments and/or confirm a linguistic boundary previously identified by the decoder. In some instances, linguistic boundaries are detected in the streaming audio data prior to being transcribed by the decoder.

A linguistic boundary is representational marker identified and/or generated to signify the end of a complete sentence. In other words, a linguistic boundary exists at the end of a complete sentence, typically just after the end of the last word of the sentence. Based on the linguistic boundary, correct punctuation can be determined, which is placed at the linguistic boundary (i.e., just after the last word of the sentence). Additionally, a text or audio segment can be further segmented into at least one portion which includes a complete sentence and a second portion which may or may not include another complete sentence. It should be appreciated that linguistic boundaries can also be detected at the end of audio or text phrases which a speaker or writer has intentionally spoken or written as a sentence fragment. In some instances, the linguistic boundary is predicted when a speaker has paused for a pre-determined amount of time. In some instances, the linguistic boundary is determined based on context of the first segment (or first portion of the segment) in relation to a subsequent segment (or subsequent portion of the same segment).

Once the decoded segment 306A has been punctuated by the punctuator 308, the punctuated segment 310A is analyzed by the orchestrator 312 which is configured to detect one or more portions of the punctuated segment 310A which are correctly segmented and punctuated portions (e.g., complete sentences) and only output the completed sentences (e.g., output 314A) to the user display 316.

Some example user displays, or user interfaces, include an audio-visual display such as television or computer monitor, an interactable display which displays output as well as receives user input, such as a mobile device or tablet. In some instances, the output is displayed in succession, with only a limited number of outputs displayed on the display such as in the case of live captioning of streaming audio/audio-visual data. In some instances, outputs are appended to one another to form a final transcript, with each output being displayed as part of the in-progress transcript as outputs are generated. Such transcripts could be displayed via a scrollable user interface. In some instances, outputs are displayed only when all final outputs (i.e., correctly segmented, and punctuated outputs) have been generated.

In some instances, the output 314A comprise grammatically complete sentences, while in some instances, the output 314A comprise grammatically incomplete or incorrect transcriptions, but that are still correctly segmented and punctuated because the output 314A comprises portions of the initially decoded segment which correspond to intentional sentence fragments and/or intentional run-on sentences. In some instances, the decoded segment comprises a single complete sentence, multiple complete sentences, a partial sentence, or a combination of complete and partial sentences in any sequential order.

Attention will now be directed to FIG. 3B which illustrates an example of input audio being processed by the automatic speech recognition system depicted in FIG. 3A. For example, streaming audio data 302B is obtained which comprises the spoken language utterance "i will walk the dog tonight at ten pm i will feed him after i walk him". The decoder 304 decodes a first segment of audio and outputs a decoded segment 306B comprising "i will walk the dog tonight at ten pm i will". In this instance, the streaming audio data was initially segmented in this manner due to a pause (i.e., speaker silence) denoted in the input audio data by " . . . ". The punctuator 308 then punctuates this decoded segment and outputs a punctuated segment 310B (e.g., ""I will walk the dog tonight at 10 P.M. I will.").

The orchestrator 312 is then configured to detect which portions of the punctuated segment are completed segments and output only those one or more portions which are completed sentences. As shown in FIG. 3B, the orchestrator 312 recognizes that "I will walk the dog tonight at 10 P.M.") is a complete sentence and generates the output 314B corresponding to that first portion of the punctuated segment. The second portion of the punctuated segment ("I will.", see portion 311) is determined to be an incomplete sentence and is therefore retained in the orchestrator (and/or a storage cache) without being generated as output which can be transmitted to the user display 316. The first portion of the punctuated segment (e.g., output 314B) is transmitted to the user display and presented on the user display.

Attention will now be directed to FIG. 3C, which illustrates a continuation of the speech processing depicted in FIG. 3B. For example, the subsequent portion of the streaming audio data 302A (e.g., "feed him after i walk him") is decoded by the decoder 304 which generates the decoded segment 306C. The punctuator 308 then punctuates the decoded segment and generates the punctuated segment 310C (e.g., "feed him after I walk him.") Because the orchestrator retained the previous portion "I will", the punctuator, in some instances, assumes that the next punctuated segment should not be capitalized as the beginning of new sentence, but rather will be appended to the retained portion of the previous punctuated segment. Thus, the orchestrator 312 generates output 314C (e.g., "I will feed him after I walk him."). In some instances, when the punctuator 308 has not recognized this connected between punctuated segments or if some punctuation is left over from a previously punctuated segment, overlapping or extraneous punctuation can be corrected and reconciled prior to being displayed on the user display (e.g., the period previously included in the punctuated segment 310B after "I will." is removed in the output 314C.

In the case where no linguistic boundary is detected in the initial segment, the computing system refrains from outputting the initial segment of decoded streaming audio data and continues to decode the streaming audio data until a subsequent segment of decoded streaming audio data is generated and appended to the initial segment of decoded streaming audio data. In this manner, the system analyzes the joined segments to determine if a linguistic boundary exists.

In some embodiments, the computing system utilizes a cache which facilitates the improved timing of output of the different speech segments. For example, the system stores the initial segment of decoded streaming audio data in a cache. Then, after outputting the first portion of the initial segment, the system clears the cache of the first portion of the initial segment of the decoded streaming audio data. In further embodiments, while clearing the cache of the first portion of the initial segment of decoded streaming audio data, the system retains the second portion of the segment of decoded streaming audio data in the cache. Embodiments that utilize a cache in this manner improve the functioning of the computing system by efficiently managing the storage space of the cache by deleting data that has already been output and retaining data that will be needed in order to continue to generate accurately punctuated outputs.

For example, when the second portion of the initial segment of decoded streaming audio is retained in the cache, the system is able to store a subsequent segment of decoded streaming audio data in the cache, wherein the subsequent segment of decoded streaming audio data is appended to the second portion of the initial segment of decoded streaming audio data to form a new segment of decoded streaming audio data.

The system then determines whether a subsequent linguistic boundary exists within the new segment of decoded streaming audio data. When a subsequent linguistic boundary is determined to exist, the system applies a new punctuation at the subsequent linguistic boundary and outputs a first portion of the new segment of the streaming audio data ending at the subsequent linguistic boundary while refraining from outputting a second portion of the new segment located temporally subsequent to the second portion of the initial segment.

The disclosed embodiments are directed to systems, methods, and devices which provide for automated segmentation and punctuation, as well as user-initiated segmentation and/or punctuation. For example, the decoder is configurable to generate decoded segments based on a user command and/or detected keyword recognized within the streaming audio data. Similarly, the punctuator is configurable to punctuate a decoded segment based on a user command and/or detected keyword within the decoded segment.

Figure 4A:
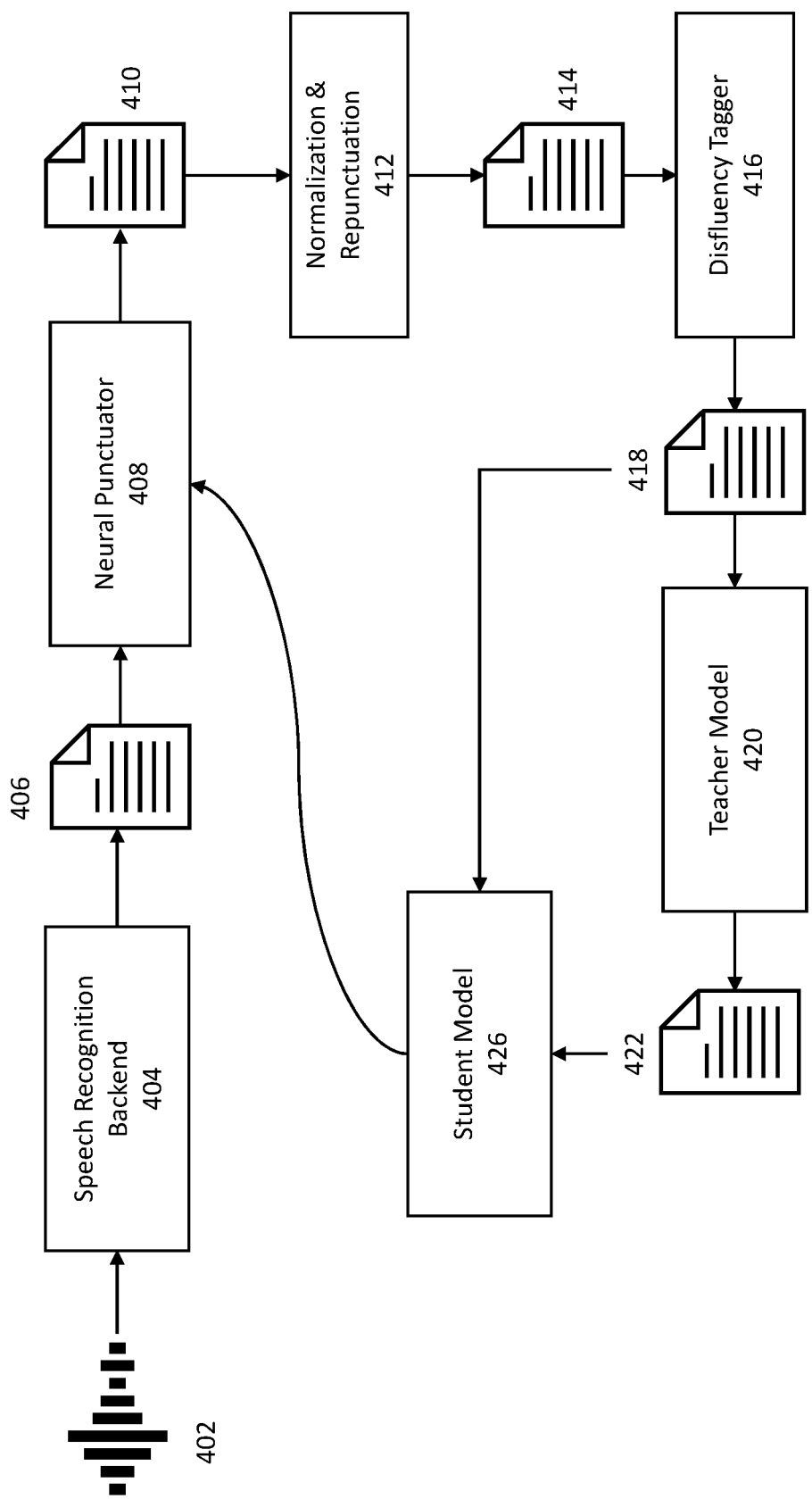
FIGS. 4A-4B illustrate example flowcharts for tagging and correcting disfluencies occurring in decoded audio data during training and for use during runtime.

Attention will now be directed to FIG. 4A, which illustrates an example flowchart for improving the readability of decoded audio data using a disfluency tagger. As shown in FIG. 4A, once the system has generated a validated output, the system is then able to analyze the output for any disfluencies. While FIG. 4A illustrates a disfluency tagging process after repunctuation (i.e., validation), it should be appreciated that the disfluency tagging could also occur in different locations of the speech processing pipeline, including after the speech recognition backend or after the neural punctuator.

As shown in FIG. 4A, audio data 402 is processed by the speech recognition backend 404 (e.g., ASR model) which outputs decoded audio data 406 (e.g., speech labels corresponding to spoken language utterances recognized in the audio data 402). The neural punctuator 408 then generates an initial set of punctuations for the decoded audio data, applies the initial set of punctuations, and generates punctuated data 410. In some instances, the system identifies labels that can be normalized (e.g., numbers, dates, addresses, etc.) and performs normalization 412 for the identified labels. Additionally, it should be appreciated that the orchestrator illustrated in FIGS. 3A-3C may be used to throttle and validate different portions of decoded audio data to ensure optimal segmentation prior to either the neural punctuator, the normalization/repunctuation, and/or the disfluency tagger. Thus, the data 414 illustrated in FIG. 4A, in some instances, is representative of output 314A illustrated in FIG. 3A.

FIG. 4A also is shown having a disfluency tagger 416 which is configured to identify and tag disfluencies in the decoded audio data. These disfluencies can be related to interjection or filler words, repeated words, poor initial punctuation, among other disfluencies discussed below in reference to FIGS. 6-11.

As illustrated in FIG. 4A, after the decoded audio data is punctuated, the system applies a series of post processing to further improve the punctuations. Some of these post processing steps include using a teacher model 420 (e.g., a large scale pre-trained model (LS-PTM) for example, a generative model, or a GPT-based novel labeler) as a weak labeler, using identified disfluencies as and additional guide for improvement in the punctuation, and using the teacher model 420 as a predictor of a punctuation point. In some instances, the teacher model 420 is used as a readability scorer which reports how a readability score for different sets of words that form a similar sentence. When the different sentences comprise the same words, and only the punctuation are different, the scorer can report which sentence is more readable over the other sentence(s).

Disclosed embodiments are direct to a further improvement of this readability scoring process in that systems and methods are provided for creating weakly labeled punctuations in a completely automated manner, without requiring human labelling effort to generate the training data. The weakly labeled data, or a subset of the best weak labels, is used as training data to fine tune one or more production models. Subsequently, the system selects the model the produces the most readable text as determined by the scorer and/or human evaluators.

The objective of the teacher model 420 is to decide what the best punctuation labels are, particularly for decoded audio data which include speech disfluencies. In some instances, in order to save on computational expense and time, the teacher model 420 is only applied to portions of decoded audio data where disfluencies have been tagged/identified.

There are many different ways in which the teacher model 420 is able to correct a disfluency and improve the readable of the decoded audio data. For example, if a current sentence has a disfluency in it (e.g., "And uh bought some new clothes."), then it can be merged with its previous sentence (e.g., "I went to the mall."). In some instances, the decision of whether or not to merge the sentences is based on determining if the character count of the previous sentence plus the character count of the current sentence is below a predefined maximum character length.

For this merge of sentences to occur, the teacher model 420 scores the previous and current sentence separately. Additionally, the teacher model 420 is configured to divide by the number of words in both the previous and current sentences to find the average score per word (i.e., original score). The model then computes the average score per word for the two sentences joined together as one sentence, using various different punctuations. The sentences will be merged according to whatever punctuation is associated with the highest score. For example, in some instances, the model merges the sentences using a comma and computes an average score per word for a comma score, (e.g., "I went to the mall, and uh bough some new clothes"). In some instances, the model merges the sentences without any punctuation using only a character space between the two sentences and computes a no punctuation score (e.g., "I went to the mall and uh bought some new clothes."). If the comma score is higher than the no punctuation score, or other score based on one or more different connecting punctuation marks, then the previous and current sentences will be merged as one sentence, as a final output with a comma placed between the different sentences (i.e., where the original sentence boundary was identified).

In another example, sometimes, the disfluency does not occur at the beginning of a sentence, nor does it occur at the end of the sentence, so a different technique is required to correct the disfluency. In such instances, the system creates a version of the original sentence without the disfluency, referred to as a modified sentence. The system also creates a number of new prospective sentences (e.g., a current modified sentence and a next modified sentence) by taking the modified sentence and splitting the modified sentence where the disfluency was tagged. For example, if the original sentence is "I went kayaking today, uh, but I felt very cold." the disfluency is the word "uh". The system then generates the modified sentence by removing "uh" (e.g., "I went kayaking today, but I felt very cold."). Subsequently, the system splits the modified sentence into two different sentences using a sentence boundary defined at the temporal location of the disfluency. Thus, the current modified sentence is: "I went kayaking today." and the next modified sentence is: "But I felt very cold today.".

The system is then able to score whether the next modified sentence should be merged with the current modified sentence and which punctuation mark should be used to merge the sentences without the disfluency. For example, now with the two sentences, the merging logic above may be applied to determine if merging yields a higher score, and which punctuation mark will yield the highest readability score if the sentences are merged.

Thus, in some instances, the system compares at least four different scores. A first score is calculated based on merging the sentences with a comma inserted just before the disfluency (e.g., "I went kayaking today, but I felt very cold."). A second score is calculated based on merging the sentences with a character space (e.g., "I went kayaking today but I felt very cold."). A third score is calculated based on merging the two sentences with a period (e.g., "I went kayaking today. But I felt very cold."). A fourth score is calculated based on merging the sentences with a question mark (e.g., I went kayaking today? But I felt very cold."). For the third and fourth scores, the system checks if the average per word readability score for the two new sentences is better than the average per word readability score of the original sentence. If that is the case, then the system only considers the third option as a potential contender, with a readability score set as the average of the two new sentences, otherwise the system considers it to have a score of infinity.

If the score from the previous step that was chosen is worse than the readability score of the original sentence, then the system repeats the process, choosing the best option among the generated options, but with retaining the disfluency in the different sentence options. Additionally, if the disfluency comes at the end of the sentences, or if the sentence has a disfluency, the system considers merging the sentence with the sequentially subsequent sentence (as opposed to previous sentence as described above). The merging logic is similar to the options described above, including refraining from merging the sentences if the character length of the merged sentences exceeds a predefined maximum character length. Alternatively, if there is no subsequent sentence to merge with the current sentence, the system is configured to adjust the punctuation, for example at the end of the sentence if the disfluency occurs at the end of the sentence, and select a punctuation from among a period, question mark, comma, exclamation point, or other punctuation mark, etc.

The teacher model 420 will run all of the aforementioned analysis on each disfluency, in each sentence, such that the final labeled output is influenced by the multiple stages of analysis as described above. Because most punctuation models are trained on written text which was generated based on standard and/or polished written communication styles, conventional punctuators are ill-equipped to process and accurately punctuate decoded audio data which includes speech disfluencies which do not typically occur in written text. Spoken language is very spontaneous and contains disfluencies, such as "uh", "uhm", "you know", "right", as well as repeated words. Even human labelers often find it difficult to label dysfluencies in text. This is why leveraging the teacher model 420 (i.e., a large pretrained model) allows the ASR system to generate punctuated text while taking into consideration and accounting for imperfections in the original speech data.

However, because of the size of the LS-PTM (e.g., teacher model 420), the large pretrained model is used as a teacher model to generate weak labels (selected from the sentences having the highest readability scores as described above) which are used as training data 422 to train more computationally efficient punctuation models (e.g., student model 426). Further refinements are realized when the system is able to repunctuate the speech recognition output in blocks of sentences comprising sentences that have been defined by a semantic segmentation model. With this refinement, the system is able to improve the performance of the model, for example, performing repunctuation with the LS-PTM after every seven sentences, instead of every two sentences.

Figure 4B:
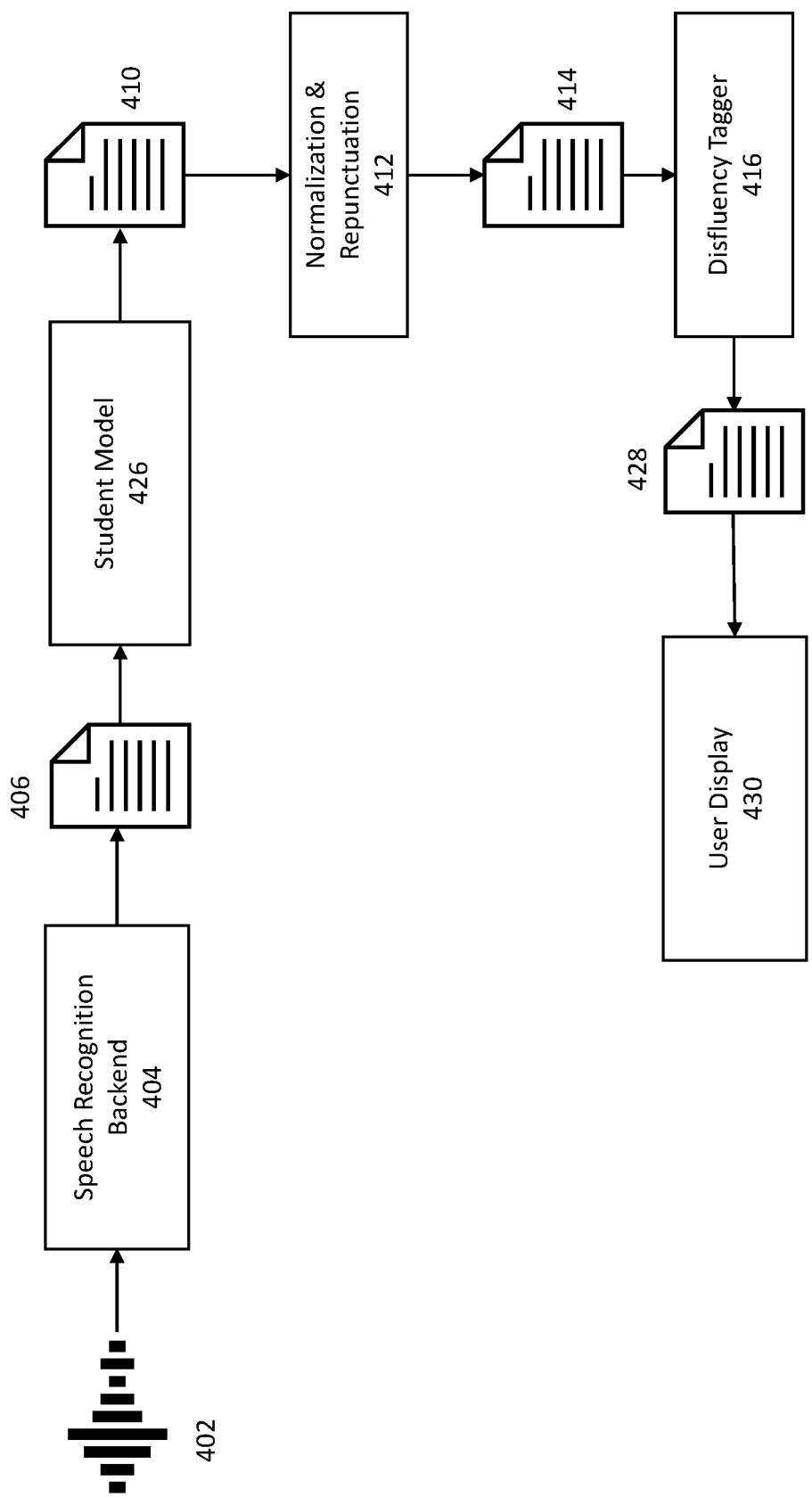

After the student model 426 is trained, the system replaces the neural punctuator 408 with the student model to be used during run-time. Attention will now be directed to FIG. 4B, which illustrates a process flowchart for performing speech-to-text transcription using the trained student model.

After the student model is fine-tuned and selected from among a variety of student models as having the highest readability scores for decoded audio data, the student model is then used to process decoded audio data 406 to generate updated decoded audio data 428, using the normalization and repunctuation 412, as well as the disfluency tagger 416. The system is then able to transmit the updated decoded audio data 428 and display the updated decoded audio data 428 at a user display 430. The user experience is greatly improved because the updated decoded audio data 428 has a higher readability score over the original decoded audio data. In some instances, during run-time, the disfluency tagger 416 tags and corrects disfluencies identified in the audio data received as input to the disfluency tagger. In some instances, during run-time, the audio data output from the normalization and repunctuation 412 is transmitted to and displayed at the user display 430, without undergoing tagging.

Figure 5:
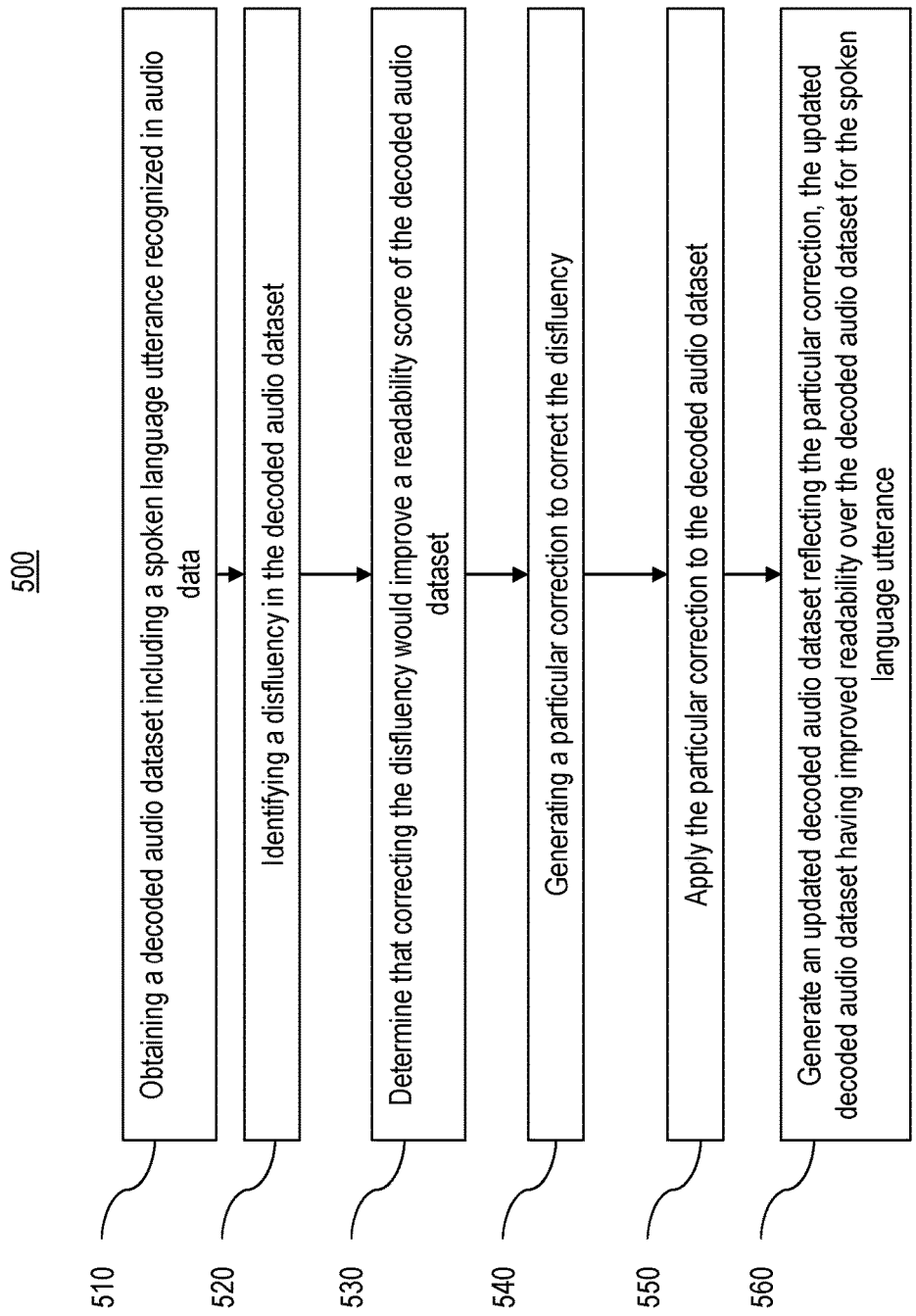
FIG. 5 illustrates one embodiment of a flow diagram having a plurality of acts for generating improved speech transcriptions by identifying and correcting disfluencies occurring in decoded audio data.
Figure 9:
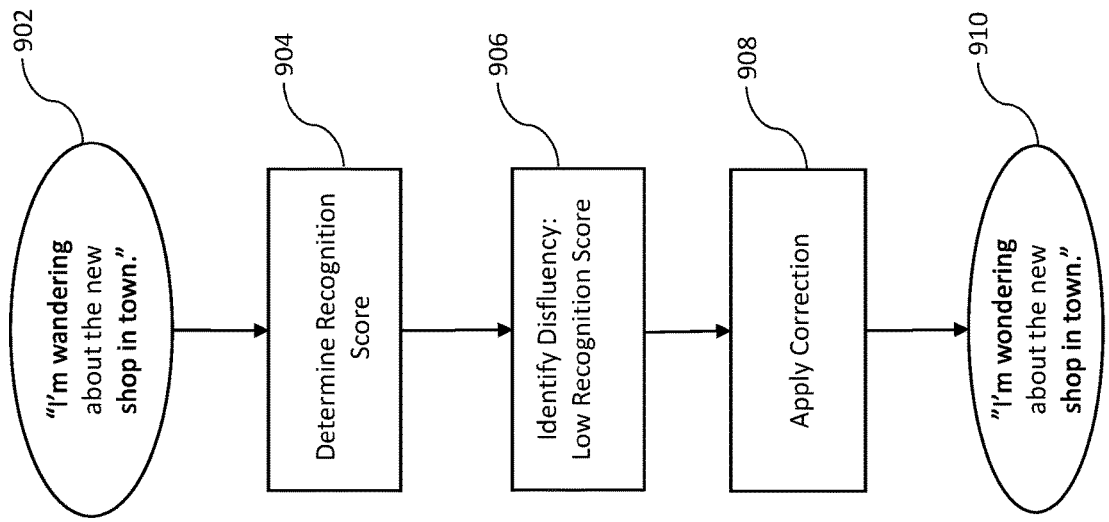
FIG. 9 illustrates an example embodiment of identifying and correcting a disfluency associated with word having a low recognition score included in the decoded audio data.

Attention will now be directed to FIG. 5 which illustrates a flow diagram 500 that includes various acts (act 510, act 520, act 530, act 540, act 550, and act 560) associated with exemplary methods that can be implemented by computing system 210 for generating improved speech transcriptions. For example, FIG. 9 illustrates a method for generating updated decoded audio data by identifying and correcting disfluencies.

The first illustrated act includes an act of obtaining a decoded audio data including a spoken language utterance recognized in audio data (act 510). The system then identifies a disfluency in the decoded audio data (act 520). Subsequently, the system determines if correcting the disfluency would improve a readability score of the decoded audio data (act 530). The act of determining whether a detected disfluency in the audio should be corrected or remain unchanged, to improve readability of a transcription of the utterance, the system applies machine learning algorithms that have been trained to score readability of different utterances. In some cases, the system applies the same model to different types of spoken utterances when making this determination. In other cases, different trained models are applied to different contexts (e.g., different data subject matter, different languages, different speakers, different education levels of the speakers and/or intended audience, etc.).

In many instances, it is determined to fix the disfluency to improve readability. However, in some embodiments, it is determined that the disfluency should be retained to maintain readability and that any change will negatively impact readability of the utterance. In fact, some disfluencies may be part of an intentional and deliberate style of speaking, such as to emphasize a particular term or concept.

Upon determining that correcting the disfluency would improve the readability score of the decoded audio data, the system generates a particular correction configured to correct the disfluency (act 540) and applies the particular correction to the decoded audio data (act 550). Finally, the system generates an updated decoded audio data reflecting the particular correction (act 560). The updated decoded audio data has an improved readability score over the decoded audio data for the spoken language utterance.

In some instances, the decoded audio data is obtained by first obtaining audio data comprising language utterances from a speaker and continuously decoding the streaming audio data in order to generate decoded audio data. The system then determines whether a linguistic boundary exists within an initial segment of decoded audio data. When a linguistic boundary is determined to exist, identifying a first portion of the initial segment that is located temporally prior to the linguistic boundary (e.g., that precedes the linguistic boundary) and a second portion of the initial segment located temporally subsequent to the linguistic boundary. Subsequently, the first portion of the initial segment of the audio data is output, while refraining from outputting the second portion of the initial segment, wherein the decoded audio data comprises the first portion of the initial segment of the audio data.

After the updated decoded audio data is generated, the system is configured to display the updated decoded audio data. In some instances, the audio data obtained is streaming audio data. In some instances, the audio data obtained is streaming audio data, wherein the updated decoded audio data is displayed as a live captioning of the streaming audio data. Additionally, or alternatively, the audio data obtained is a previously recorded data, wherein the updated decoded audio data is displayed as a complete transcription of the audio data.

Disfluencies

It will be appreciated that there are many different types of disfluencies which may be corrected, or selectively retained, based on different attributes associated with the decoded audio data. For example, attention will be directed to FIGS. 6-11, which each illustrate different disfluency corrections that can be selectively made to improve readability of the decoded audio data.

Figure 6:
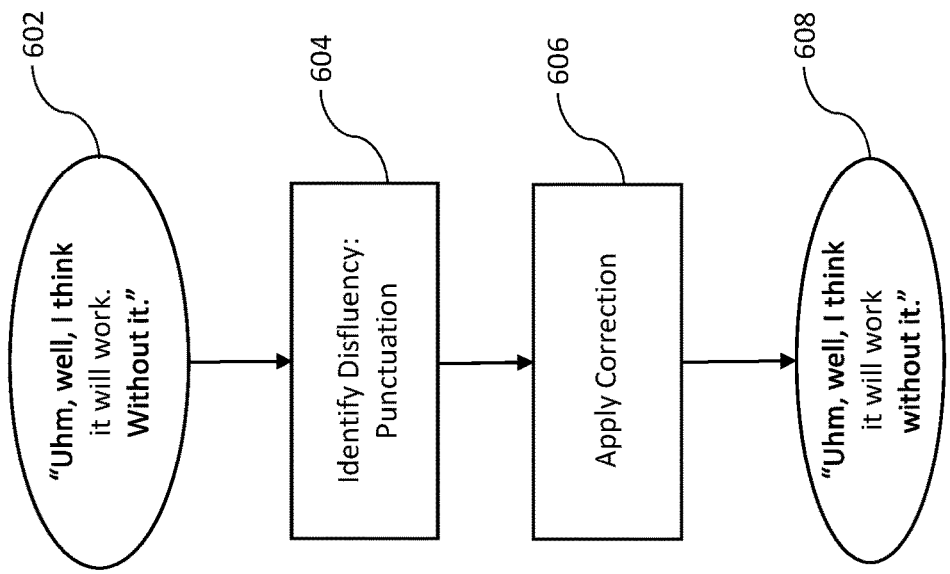
FIG. 6 illustrates an example embodiment of identifying and correcting a disfluency associated with punctuation included in the decoded audio data.

Attention is now directed to FIG. 6, which illustrates an example embodiment of identifying and correcting a disfluency associated with punctuation included in the decoded audio data. As shown in FIG. 6, the decoded audio data 602 comprises the sentence "Uhm, well, I think it will work. Without it." The system identifies a disfluency 604 associated with the punctuation at the segmentation boundary between "work" and "Without". The system determines that merging the two sentences will yield a higher readability score than the original sentence and applies the correction (e.g., apply correction 606). The updated decoded audio data 608 comprises "Uhm, well, I think it will work without it." which reflects the correction to the punctuation (e.g., a secondary punctuation) that was causing a degradation in the readability score of the original sentence. In this case, the interjection words were retained, and the sentences were merged using a character space, replacing the period that was included in the initial set of punctuations in the decoded audio data 602.

Figure 7:
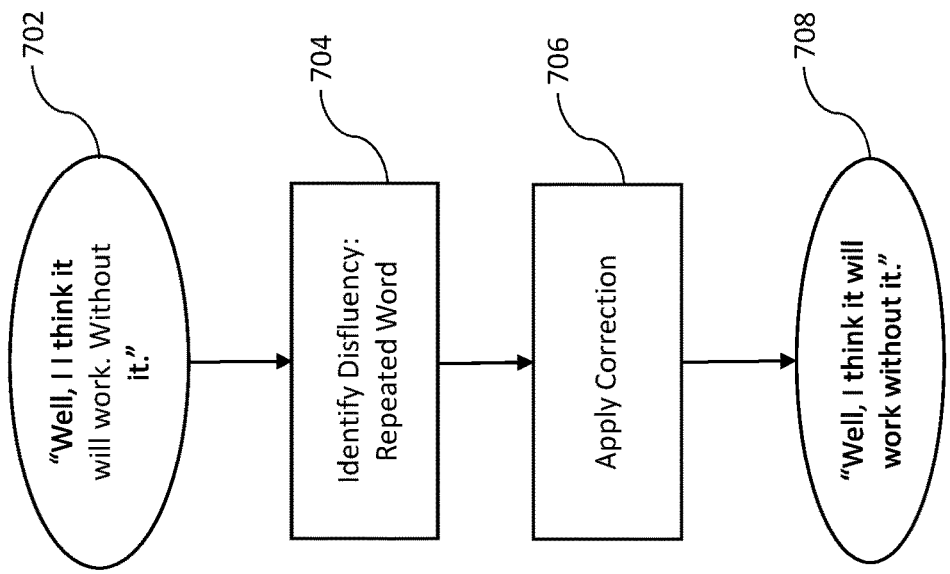
FIG. 7 illustrates an example embodiment of identifying and correcting a disfluency associated with a repeated word included in the decoded audio data.

FIG. 7 illustrates an example embodiment of identifying and correcting a disfluency associated with a repeated word included in the decoded audio data. As shown in FIG. 7, the decoded audio data 702 comprises the sentence "Well, I I think it will work. Without it." The system identifies a disfluency associated with a repeated word 704 (e.g., "I"). The system determines that removing the one of the repeated words and merging the two sentences will yield a higher readability score than the original sentence and applies the correction 706. The updated decoded audio data 708 comprises "Well, I think it will work without it." which reflects the correction to the repeated word that was causing a degradation in the readability score of the original sentence. In summary, when the disfluency is associated with a repeated word, applying the particular correction to the decoded audio data includes, in some instances, removing one or more of the repeated words.

Figure 8:
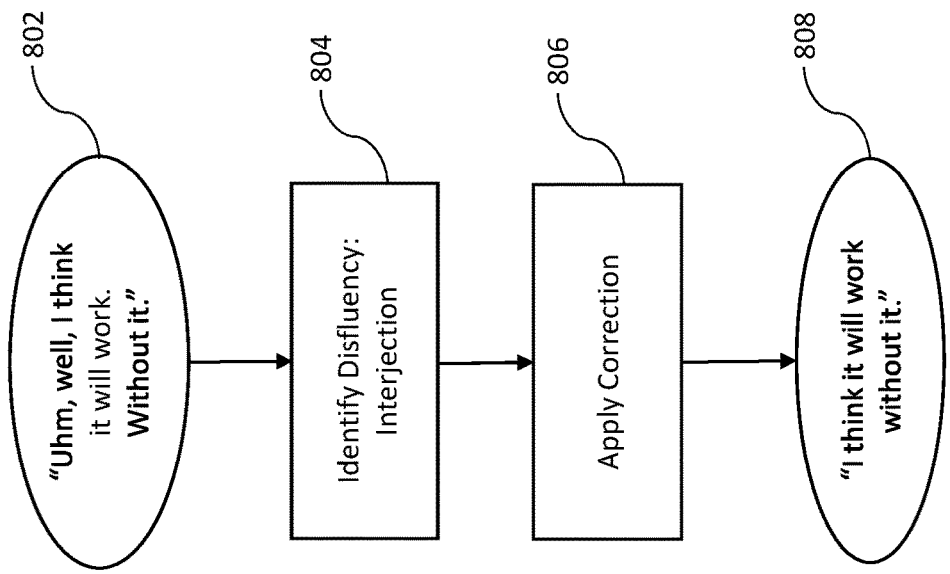
FIG. 8 illustrates an example embodiment of identifying and correcting a disfluency associated with an interjection word included in the decoded audio data.

Attention will now be directed to FIG. 8, which illustrates an example embodiment of identifying and correcting a disfluency associated with an interjection word included in the decoded audio data. As shown in FIG. 8, the decoded audio data 602 comprises the sentence "Uhm, well, I think it will work. Without it." The system identifies a disfluency associated with the interjection words 804 (e.g., "Uhm" and "well") at the beginning of the sentence. The system determines that removing the interjection words and merging the two sentences will yield a higher readability score than the original sentence and applies the correction (e.g., apply correction 806). The updated decoded audio data 808 comprises "I think it will work without it." which reflects the correction to the punctuation that was causing a degradation in the readability score of the original sentence. In this case, the interjection words were removed, and the sentences were merged using a character space, replacing the period that was included in the initial set of punctuations in the decoded audio data 802.

Thus, as illustrated by the example in FIG. 8, when the disfluency is associated with an interjection word, applying the particular correction to the decoded audio data, in some instances, comprises removing one or more of the interjection words.

Attention will now be directed to FIG. 9, which illustrates an example embodiment of identifying and correcting a disfluency associated with word having a low recognition score included in the decoded audio data. As shown in FIG. 9, the decoded audio data 902 comprises the sentence "I'm wandering about the new shop in town."

The system determines a recognition score 904 for each of the labels included in the decoded audio data and determines that the label for "wandering" has a recognition score that fails to meet or falls below a predefined recognition score threshold. This low recognition score is used to identify the disfluency 906 associated with the word "wandering".

The system determines that replacing "wandering" with a word that has a higher recognition score or that has a higher context score in relation to the other labels of the sentence, will yield a higher readability score than the original sentence and applies the correction (e.g., apply correction 908). The updated decoded audio data 910 comprises "I'm wondering about the new shop in town" which reflects the correction to the punctuation that was causing a degradation in the readability score of the original sentence. In this case, the word "wandering" was replaced with the word "wondering" to improve the readability score.

Figure 10:
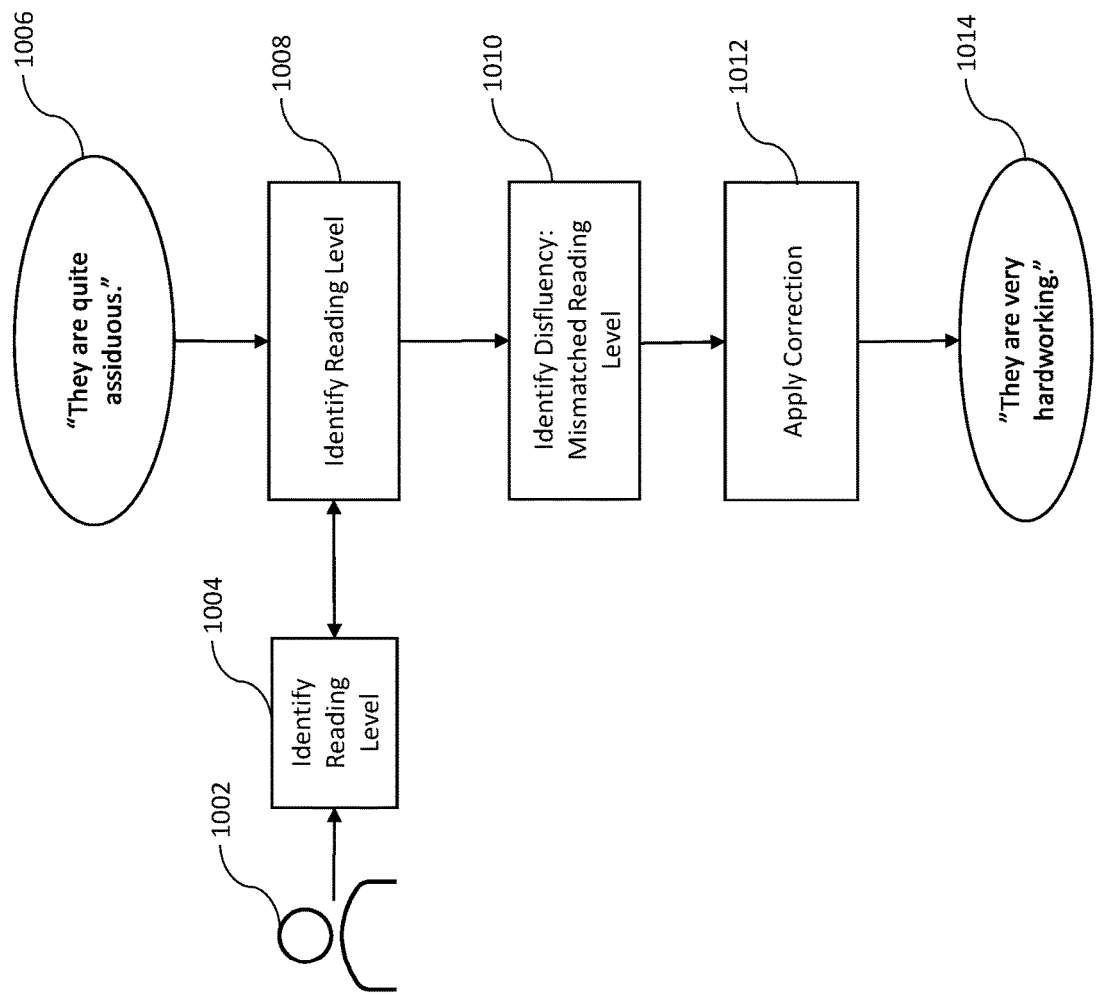
FIG. 10 illustrates an example embodiment of identifying and correcting a disfluency associated with mismatched reading levels of the decoded audio data and a target reader.

Attention will now be directed to FIG. 10, which illustrates an example embodiment of identifying and correcting a disfluency associated with mismatched reading levels of the decoded audio data and a target reader. For example, as shown in FIG. 10, the system identifies a first reading comprehension level 1004 of a target user 1002 to whom the updated decoded audio data will be displayed. The system also identifies a second reading comprehension level 1008 associated with a particular word (e.g., assiduous) included in the decoded audio data 1006.

The system compares the reading levels and determines that the second reading comprehension level is higher than the first reading comprehension level, wherein the disfluency 1010 is identified based on determining that the second reading comprehension level is higher than the first reading comprehension level (i.e., that the reading levels are mismatched). Thus, applying the particular correction 1012 to the decoded audio data comprises replacing the particular word with a new word (e.g., hardworking) having a reading comprehension level that is equal to or less than the first reading comprehension level which improves the readability of the updated decoded audio data 1014 for the target user, while maintaining a similar semantic meaning of the sentence (i.e., conveys a similar message to the target reader).

Figure 11:
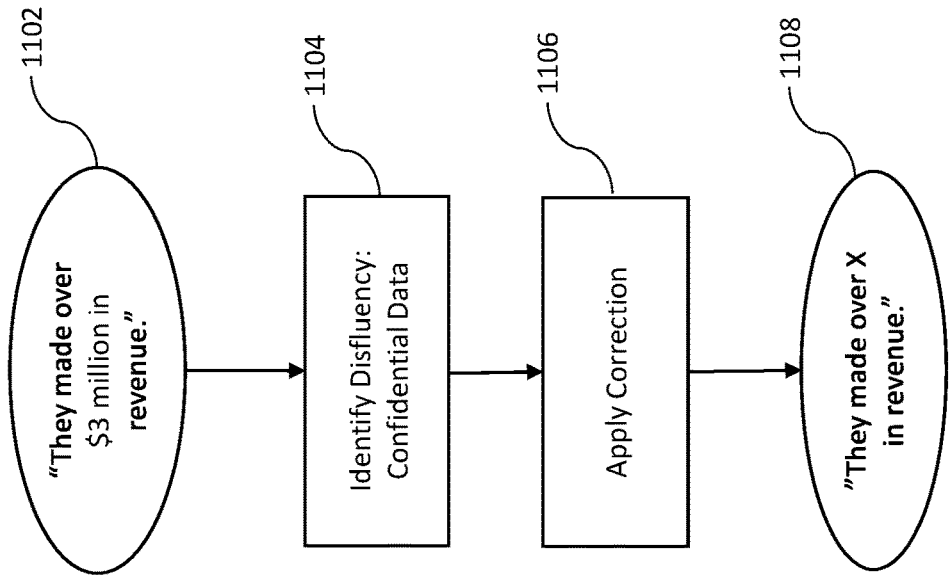
FIG. 11 illustrates an example embodiment of identifying and correcting a disfluency associated with confidential information included in the decoded audio data.

Attention will now be directed to FIG. 11, which illustrates an example embodiment of identifying and correcting a disfluency associated with confidential information included in the decoded audio data. As shown in FIG. 11, the decoded audio data 1102 comprises the sentence "They made over $3 million in revenue." The system identifies a disfluency associated with confidential information 1104 related to the disclosure of how much revenue the company made.

In some instances, a user may wish to share this decoded audio data outside the company but cannot disclose the confidential information/data. The system applies the correction 1106 so that the updated decoded audio data 1108 comprises "They made over X in revenue." which reflects the correction to the confidential data (e.g., redacting the previously disclosed amount) or replacing the particular word with a new word that is not associated with confidential information.

User Display Settings

Figure 12:
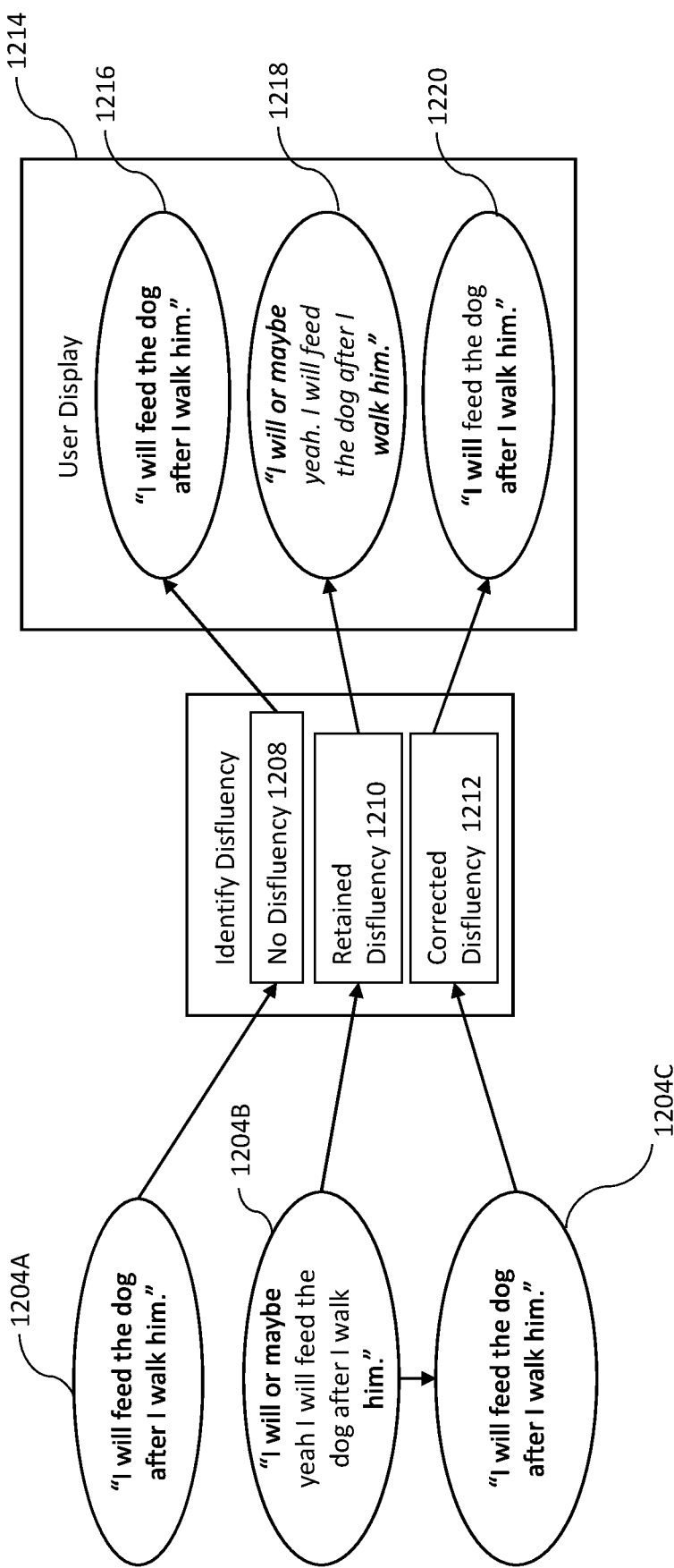
FIG. 12 illustrates an example embodiment of determining when and how to display the updated decoded audio data.

Attention will now be directed to FIG. 12, which illustrates an example embodiment of determining when and how to display the updated decoded audio data. For example, updated decoded audio data 1204A comprises the sentence: "I will feed the dog after I walk him." The system analyzes the sentence and determines there is no disfluency 1208 and displays the updated decoded audio data at the user display 1214 in a regular typeface 1216. The updated decoded audio data 1204B comprises the sentence: "I will or maybe yeah I will feed the dog after I walk him." The system analyzes the sentence and determines that a disfluency was identified but retained 1210 in the updated decoded audio data. The updated decoded audio data is displayed at the user display 1214 in an italicized typeface 1218 to indicate the existence and retention of the identified disfluency. This can be helpful to put a reader, or sender, on notice of a possible disfluency that may or may not need to be corrected.

Updated decoded audio data 1204C comprises the sentence "I will feed the dog after I walk him." which reflects a correction to the interjection disfluency (e.g., "or maybe yeah") identified in updated decoded audio data 1204B. Thus, the system identifies the corrected disfluency 1212 and displays the updated decoded audio data at the user display 1214 by bolding a portion of the sentence 1220 associated with the removed interjection words. In this manner, a user reading the sentences on the user display is able to know if a disfluency was identified and where the disfluency was corrected based on the different formatting that was applied. This can be helpful, particularly for helping provide the user visibility to changes that have been made.

In view of the foregoing, it will be appreciated that there are various different techniques that can be applied for identifying a corrected disfluency in the updated decoded audio data and for applying different first visual formatting corresponding to the corrected disfluencies than the formatting applied to the rest of the decoded audio data. In particular, as described and shown, when the updated decoded audio data is displayed at a user display, the user display reflects the first visual formatting and the second visual formatting to indicate to a user which portion of the decoded audio data has been corrected. The system then displays the updated decoded audio dataset, including the first visual formatting and second visual formatting at the user display.

Figure 13:
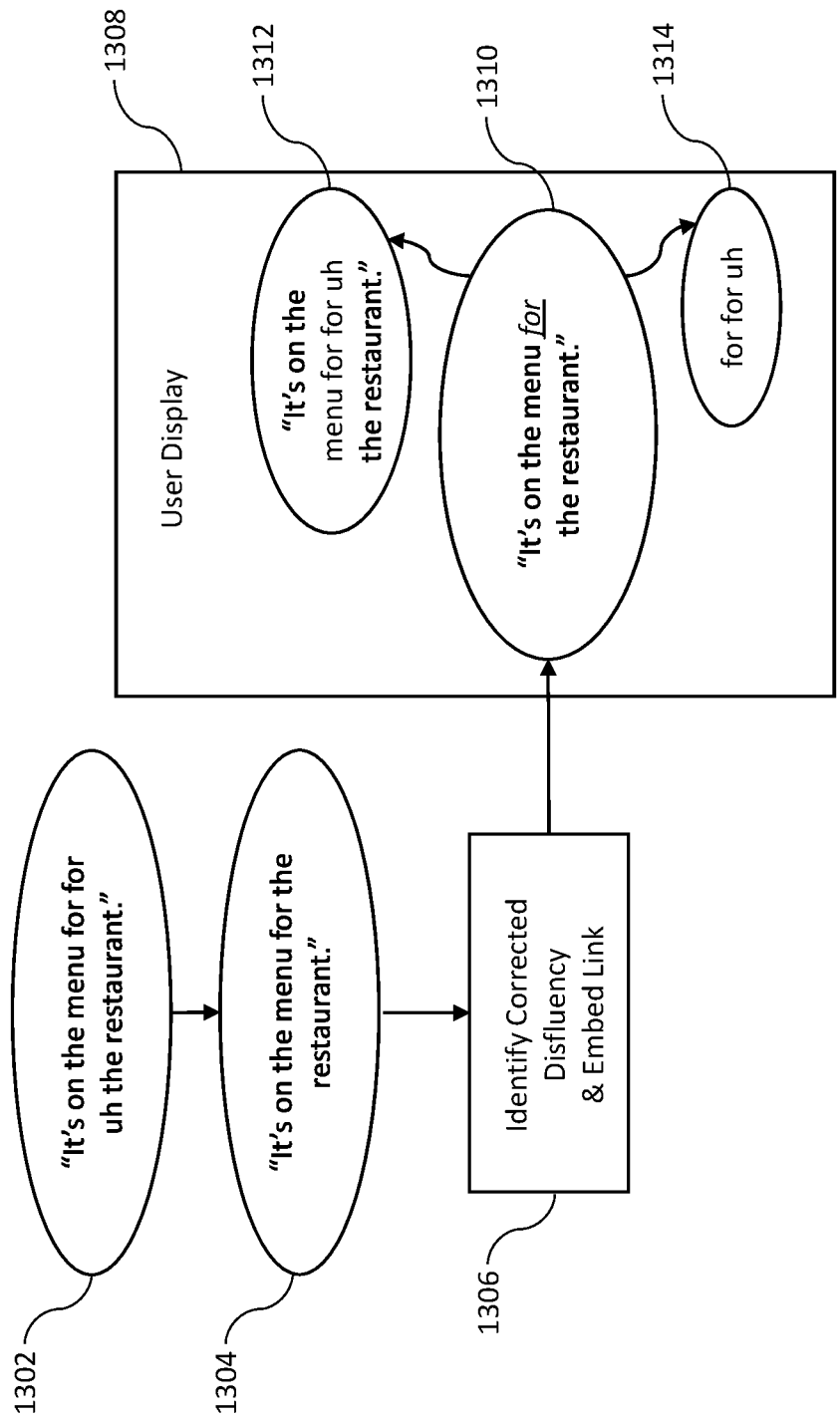
FIG. 13 illustrates an example embodiment of displaying the updated decoded audio data, including displaying an embedded link directing a user to the original version of decoded audio data.

Attention will now be directed to FIG. 13, which illustrates an example embodiment of a related method for displaying updated decoded audio data, including displaying an embedded link directing a user to an original version of decoded audio data (e.g., the data that existed before the disfluency was corrected). For example, decoded audio data 1302 comprises the sentence: "It's on the menu for for uh the restaurant." The updated decoded audio data 1304 reflects a correction that was made to the disfluency (e.g., the repeated words "for for" and interjection word "uh"). The system identifies the corrected disfluency and embeds a link 1306 associated with the corrected disfluency within the updated decoded audio data, wherein the link directs a user to an unedited version of the decoded audio data. The system can then display the updated decoded audio data, including displaying the link as a selectable object, at a user display.

In this example, the user display 1308 illustrates the displayed updated decoded audio data 1310 with the embedded link corresponding to the remaining word "for". This link is operable, when selected, to cause the user display 1308 to display the original decoded audio data 1312 (e.g., unedited). Additionally, or alternatively, when a user clicks on the selectable link, the user display is configured to display only the portion 1314 of the original sentence that was modified (e.g., "for for uh"), as shown.

Figure 14:
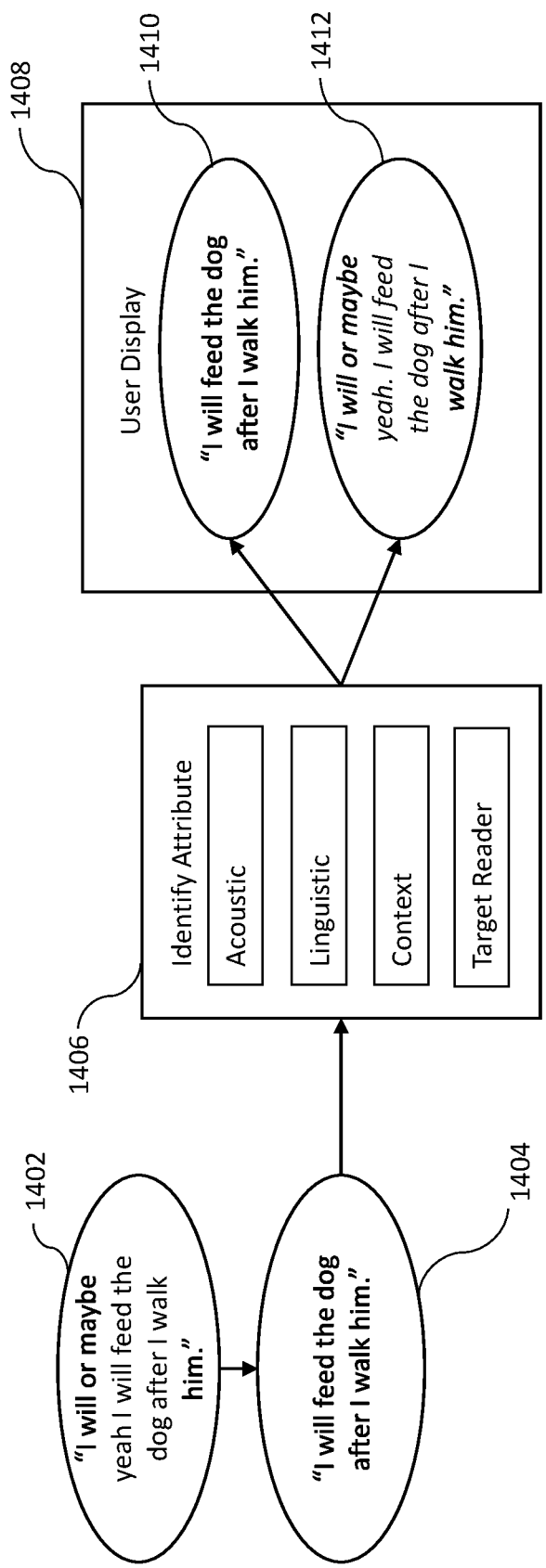
FIG. 14 illustrates an example embodiment of different ways to display the updated decoded audio data based on one or more attributes of the updated decoded audio data.

FIG. 14 illustrates an example embodiment of different ways to display the updated decoded audio data based on one or more attributes of the updated decoded audio data. In some embodiments, the system may determine to retain or remove a disfluency when displaying the updated decoded audio data based on one or more attributes. For example, decoded audio data 1402 comprises the sentence: "I will or maybe yeah I will feed the dog after I walk him." The updated decoded audio data 1404 comprises the sentence: "I will feed the dog after I walk him." In some instances, the system selectively displays either the original decoded audio data (i.e., retaining the disfluency, thereby overriding the identification of the disfluency) or removes the disfluency based on identifying an attribute 1406 associated with the decoded audio data.

By way of example, if an acoustic attribute identified from the speaker emphasizing the words "or maybe yeah", with increased volume, for example, the system may determine that the disfluency is intended and relevant in conveying the meaning of the sentence, so the system will display the original decoded audio data 1412 at the user display 1408. In another example, if a linguistic attribute is identified relating to the words "or maybe yeah" in that those interjection words do not add to the overall meaning of the sentence or are unnecessary to communicating the meaning of the sentence, the system is configured to display the updated decoded audio data 1410 at the user display.

It will be appreciated that the system may deterministically select which data to display based on attributes of context associated with the disfluency and/or an attribute of a target reader (i.e., end user of the user display).

It should also be appreciated that there are many different visual formatting modifications that can be made to the segments of decoded streaming audio prior or during their display on the user display. The visual formatting can include type-face formatting (e.g., bold, italicized, underlined, and/or strike-through), one or more fonts, different capitalization schemes, text coloring and/or highlighting, animations, or any combination thereof. While each of the following figures depicts a visual formatting modification corresponding to different typefaces, it should be appreciated that attribute analysis or external content linking may be displayed according to any of the aforementioned visual formatting types.

Figure 15:
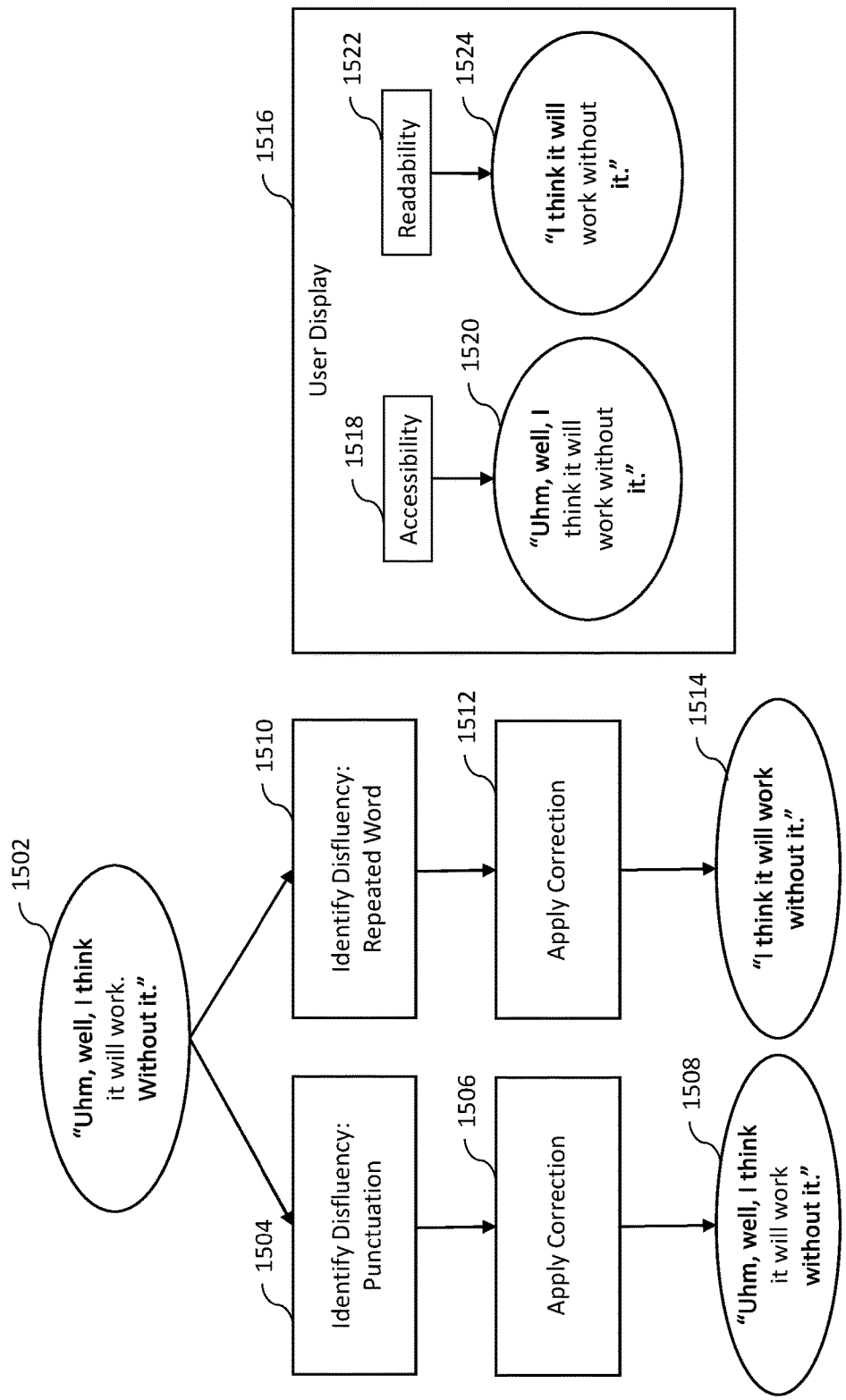
FIG. 15 illustrates an example embodiment of a user display which has at least two different modes, one for accessibility and one for readability.

Attention will now be directed to FIG. 15, which illustrates an example embodiment of a user display which has at least two different modes, one for accessibility and one for readability. As shown in FIG. 15, a computing system obtains a decoded audio data 1502 including a transcription of a spoken language utterance recognized in audio data (e.g., "Uhm, well I think it will work. Without it.").

The system then generates different updated decoded audio data based on optimizing for readability or accessibility of the user display. For example, optimizing for accessibility involves retaining a disfluency in the final output. Accordingly, the system identifies a disfluency 1504 in the decoded audio data of the spoken language utterance associated with the initial punctuation included in the decoded audio data 1502.

In this example, the system determines that correcting the disfluency would improve the readability of the transcription, while still maintaining accessibility to the exact words that were spoken. After generating a particular correction to correct the disfluency, the system applies the particular correction 1506 to the decoded audio data in order to generate an updated decoded audio data 1508 (e.g., "Uhm, well, I think it will work without it.") including the spoken language utterance reflecting the particular correction. The updated decoded audio data having improved readability over the decoded audio data of the spoken language utterance but maintains high accessibility.

Additionally, the system generates an updated decoded audio data optimized for readability. Accordingly, the system identifies a disfluency 1510 in the decoded audio data of the spoken language utterance associated with the interjection words included in the decoded audio data 1502. The system determines that correcting the disfluency would improve the readability of the transcription. After generating a particular correction to correct the disfluency, the system applies the particular correction 1512 to the decoded audio data in order to generate an updated decoded audio data 1514 (e.g., I think it will work without it.") including the spoken language utterance reflecting the particular correction which removed the interjection words because they did not contribute to the overall meaning of the sentence. The updated decoded audio data having improved readability over the decoded audio data of the spoken language utterance.

As shown in FIG. 15, the user display 1516 is configured with a plurality of modes (e.g., accessibility mode 1518 which is configured to display the updated decoded audio data 1520 which was optimized for accessibility; and readability mode 1522 which is configured to display the updated decoded audio data 1524 which was optimized for readability). The system or user is able to toggle between either mode based on user input or automatically identified attributes associated with the decoded audio data 1502.

For example, in some instances, upon determining that the disfluency should be removed in the updated decoded audio data, the system select the readability mode to display the updated decoded audio data. Alternatively, upon determining that the disfluency should be retained, select the accessibility mode to display the decoded audio data.

Furthermore, in some instances, the system receives user input indicating whether to use the readability mode or accessibility mode and selects which mode to use based on the user input. Additionally, or alternatively, the computing system automatically identify an attribute associated with a target user or an attribute associated with the target output (e.g., live captioning or discrete transcript) and selects which mode to use based on the identified attribute.

In view of the foregoing, it should be appreciated that the disclosed embodiments provided improved technical benefits over conventional automatic speech recognition systems which are not well-trained to punctuate and display decoded audio data having speech disfluencies. Technical benefits include the ability to improve segmentation and punctuation based on identified disfluencies. Additionally, the readability of the final output of the ASR system is improved by providing better punctuation if the disfluency is retained or removing the disfluency to better match standard written communication styles. This further improves additional downstream tasks such as summarization, question and answer query, or other natural language processing task.

Additionally, training is improved by using a LS-PTM to train a student model on training data that accounted for different ways of handling disfluencies in decoded audio data. Because the system considers several different options for correcting disfluencies, the user display is able to optimize for different criteria, including readability and/or accessibility.

Example Computing Systems

Embodiments of the present invention may comprise or utilize a special purpose or general-purpose computer (e.g., computing system 210) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media (e.g., hardware storage device(s) 240 of FIG. 2) that store computer-executable instructions (e.g., computer-executable instructions 218 of FIG. 2) are physical hardware storage media/devices that exclude transmission media. Computer-readable media that carry computer-executable instructions or computer-readable instructions (e.g., computer-executable instructions 218) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 230 of FIG. 2) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system for modifying a decoded audio data for improving a readability of a transcription of the decoded audio data based on language utterances occurring in audio data used to generate the decoded audio data, the method further reducing latency involved with generating a complete sentence by temporarily storing multiple incomplete sentence segments in a cache until such time as a subset of the multiple incomplete sentence segments are combinable to form the complete sentence, the method comprising:

obtaining audio data comprising language utterances from a speaker;

continuously decoding the audio data to generate decoded audio data;

after determining a linguistic boundary exists within an initial segment of the decoded audio data, identifying a first portion of the initial segment and a second portion of the initial segment based on the linguistic boundary;

outputting the first portion of the initial segment of the decoded audio data, wherein the first portion is determined to be a first complete sentence;

determining that the second portion is an incomplete sentence and that a subsequent segment of the decoded audio data will facilitate formation of a second complete sentence when the subsequent segment is appended to the second portion;

reducing latency in forming the second complete sentence by storing the second portion of the initial segment in a cache;

in response to determining that a combination of the second portion and the subsequent segment, if combined, would form the second complete sentence, appending the subsequent segment to the second portion of the initial segment to form the second complete sentence;

identifying a disfluency in the decoded audio data;

generating a particular correction to correct the disfluency;

applying the particular correction to the decoded audio data; and generating an updated decoded audio data reflecting the particular correction, the updated decoded audio data having improved readability over the decoded audio data for the spoken language utterance.

2. The method of claim 1, after applying the particular correction and generating the updated decoded audio data, displaying the updated decoded audio data at a user display.

3. The method of claim 2, wherein the audio data is streaming audio data, and wherein the updated decoded audio data is displayed as a live captioning of the streaming audio data.

4. The method of claim 1, wherein the decoded audio data comprises an initial punctuation, the method further comprising:

generating a secondary punctuation configured to facilitate a correction of a second disfluency associated with the initial punctuation, wherein applying the particular correction to the decoded audio data further comprises replacing the initial punctuation with the secondary punctuation.

5. The method of claim 1, wherein a second disfluency is associated with a repeated word, and wherein applying the particular correction to the decoded audio data further comprises removing the repeated word.

6. The method of claim 1, wherein a second disfluency is associated with an interjection word, and wherein applying the particular correction to the decoded audio data further comprises removing the interjection word.

7. The method of claim 1, further comprising:

identifying a first reading comprehension level of a target user;

identifying a second reading comprehension level associated with a particular word included in the decoded audio data;

determining that the second reading comprehension level is higher than the first reading comprehension level, wherein the disfluency is identified based on determining that the second reading comprehension level is higher than the first reading comprehension level; and wherein applying the particular correction to the decoded audio data comprises replacing the particular word with a new word, which has a reading comprehension level that is equal to or less than the first reading comprehension level.

8. The method of claim 1, further comprising:

determining a recognition score associated with a particular word included in the decoded audio data, the recognition score being associated with how accurately the computing system decoded a portion of the audio data corresponding to predict the particular word; and determining that the recognition score falls below a recognition score threshold, wherein the disfluency is identified based on determining that the recognition score falls below the recognition score threshold;

wherein applying the particular correction to the decoded audio data comprises replacing the particular word with a new word having a higher recognition score than the particular word.

9. The method of claim 1, further comprising:

identifying a particular word included in the decoded audio data, the particular word being associated with confidential information;

wherein applying the particular correction to the decoded audio data comprises redacting the particular word or replacing the particular word with a new word that is not associated with confidential information.

10. The method of claim 1, further comprising:

identifying a corrected disfluency in the updated decoded audio data;

applying a first visual formatting corresponding to the corrected disfluency that is different from a second visual formatting corresponding to the decoded audio data, such that when the updated decoded audio data is displayed at a user display, the user display reflecting the first visual formatting and the second visual formatting to indicate to a user which portion of the decoded audio data has been corrected; and displaying the updated decoded audio data, including the first visual formatting and second visual formatting at the user display.

11. The method of claim 1, further comprising:

identifying a corrected disfluency within the updated decoded audio data;

embed a link associated with the corrected disfluency within the updated decoded audio data, wherein the link directs a user to an unedited version of the decoded audio data; and display the updated decoded audio data, including displaying the link as a selectable object, at a user display.

12. The method of claim 1 further comprising:
identifying an attribute associated with the disfluency; and
based on the attribute, determining to retain the disfluency in the updated decoded audio data.

13. The method of claim 1, wherein the improved readability is based on an improved readability score.

14. The method of claim 1, wherein the particular correction is generated by a student model that was trained using training data generated by a large scale pre-trained model (LS-PTM).

15. The method of claim 14, wherein the training data comprises a subset of weak labels for audio data that were selected from a set of weak labels based on comparing readability scores for different weak label options.

16. A computer system comprising:
one or more processors; and
one or more hardware storage devices that store instructions that are executable by the one or more processors to cause the computer system to:
obtain audio data comprising language utterances from a speaker;
continuously decode the audio data to generate decoded audio data;
after determining a linguistic boundary exists within an initial segment of the decoded audio data, identify a first portion of the initial segment and a second portion of the initial segment based on the linguistic boundary;
output the first portion of the initial segment of the decoded audio data, wherein the first portion is determined to be a first complete sentence;
determine that the second portion is an incomplete sentence and that a subsequent segment of the decoded audio data will facilitate formation of a second complete sentence when the subsequent segment is appended to the second portion;
reduce latency in forming the second complete sentence by storing the second portion of the initial segment in a cache;
in response to determining that a combination of the second portion and the subsequent segment, if combined, would form the second complete sentence, append the subsequent segment to the second portion of the initial segment to form the second complete sentence;
identify a disfluency in the decoded audio data;
generate a particular correction to correct the disfluency;
apply the particular correction to the decoded audio data; and
generate an updated decoded audio data reflecting the particular correction, the updated decoded audio data having improved readability over the decoded audio data for the spoken language utterance.

17. The computer system of claim 16, wherein the instructions are further executable to cause the computer system to:
display a user interface comprising a readability mode and an accessibility mode.

18. The computer system of claim 17, wherein the instructions are further executable to cause the computer system to:
upon determining that the disfluency should be removed in the updated decoded audio data, select the readability mode to display the updated decoded audio data; or
upon determining that the disfluency should be retained, select the accessibility mode to display the decoded audio data.

19. One or more hardware storage devices that store instructions that are executable by one or more processors to cause the one or more processors to:
obtain audio data comprising language utterances from a speaker;
continuously decode the audio data to generate decoded audio data;
after determining a linguistic boundary exists within an initial segment of the decoded audio data, identify a first portion of the initial segment and a second portion of the initial segment based on the linguistic boundary;
output the first portion of the initial segment of the decoded audio data, wherein the first portion is determined to be a first complete sentence;
determine that the second portion is an incomplete sentence and that a subsequent segment of the decoded audio data will facilitate formation of a second complete sentence when the subsequent segment is appended to the second portion;
reduce latency in forming the second complete sentence by storing the second portion of the initial segment in a cache;
in response to determining that a combination of the second portion and the subsequent segment, if combined, would form the second complete sentence, append the subsequent segment to the second portion of the initial segment to form the second complete sentence;
identify a disfluency in the decoded audio data;
generate a particular correction to correct the disfluency;
apply the particular correction to the decoded audio data; and
generate an updated decoded audio data reflecting the particular correction, the updated decoded audio data having improved readability over the decoded audio data for the spoken language utterance.

\* \* \* \* \*